United States Patent
Wereley et al.

(10) Patent No.: US 12,172,923 B2
(45) Date of Patent: Dec. 24, 2024

(54) COMPOSITION WITH TUNABLE ENERGY ABSORBING PROPERTIES

(71) Applicants: University of Maryland, College Park, College Park, MD (US); Microsphere Material Solutions, LLC, Rockville, MD (US)

(72) Inventors: Norman M. Wereley, Potomac, MD (US); Jungjin Park, Gaithersburg, MD (US); John M. Howard, Alexandria, VA (US); Matthew Demay, Rockville, MD (US); Avi Edery, Rockville, MD (US)

(73) Assignees: University of Maryland, College Park, College Park, MD (US); Microsphere Material Solutions, LLC, Rockville, MD (US)

( * ) Notice: Subject to any disclaimer, the term of this patent is extended or adjusted under 35 U.S.C. 154(b) by 121 days.

(21) Appl. No.: 17/713,023

(22) Filed: Apr. 4, 2022

(65) Prior Publication Data

US 2022/0411321 A1    Dec. 29, 2022

Related U.S. Application Data

(60) Provisional application No. 63/170,270, filed on Apr. 2, 2021.

(51) Int. Cl.
*C03C 11/00* (2006.01)
*C03B 19/06* (2006.01)
*C03B 19/09* (2006.01)

(52) U.S. Cl.
CPC ............ *C03C 11/007* (2013.01); *C03B 19/06* (2013.01); *C03B 19/09* (2013.01); *C03C 11/002* (2013.01)

(58) Field of Classification Search
CPC ...... B32B 7/00–7/14; B32B 5/18–5/20; C03C 11/007
See application file for complete search history.

(56) References Cited

U.S. PATENT DOCUMENTS

| | | | | |
|---|---|---|---|---|
| 2,310,432 A | * | 2/1943 | Haux | C03C 11/007 264/43 |
| 2,837,873 A | * | 6/1958 | Lynsavage | C03B 19/08 264/43 |
| 2009/0317603 A1 | * | 12/2009 | Buhring | B32B 5/18 264/48 |

FOREIGN PATENT DOCUMENTS

| | | | |
|---|---|---|---|
| CN | 104786589 A | | 7/2015 |
| CN | 204936389 U | * | 1/2016 |

(Continued)

OTHER PUBLICATIONS

Machine translation of CN204936389U. Retrieved Dec. 6, 2023.*

(Continued)

*Primary Examiner* — Prashant J Khatri
(74) *Attorney, Agent, or Firm* — Don D. Cha; HDC Intellectual Property Law, LLP

(57) ABSTRACT

The present disclosure provides a cellular foam composition, a method for producing and using the same. One particular aspect of the disclosure provides a cellular foam composition comprising a plurality of foam layers, where each foam layer is made from a hollow microstructure material. In particular, the density of the hollow microstructure material in each foam layer is different from the density of the hollow microstructure material that forms the adjacent foam layer. In some embodiments, cellular foam compositions of the disclosure further include an interfacial layer comprising interfacial voids in between adjacent layers.

18 Claims, 20 Drawing Sheets

(56) References Cited

FOREIGN PATENT DOCUMENTS

| GB | 2499683 A | * | 8/2013 | ............ | B32B 17/064 |
| WO | WO-2021203232 A1 | * | 10/2021 | ............ | B01D 39/201 |

OTHER PUBLICATIONS

Moncanita et al. "Expanded Foam Glass-an Application for Fire Resistant Multilayer Materials", 2020 IOP Conf. Ser.: Mater. Sci. Eng., 877, 012038, (2020); pp. 1-8.*

* cited by examiner

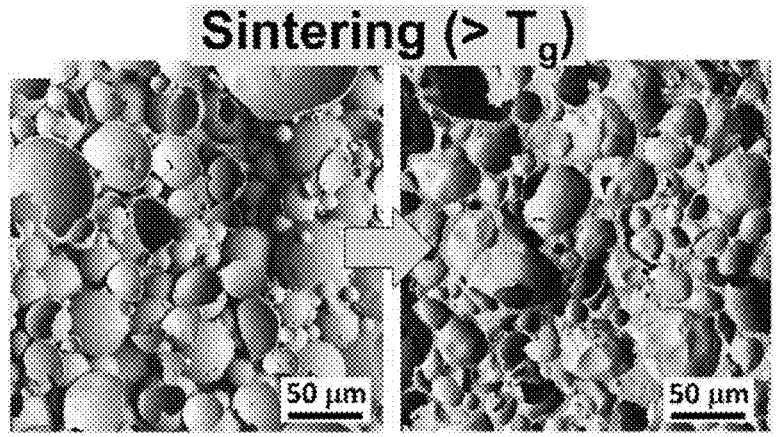
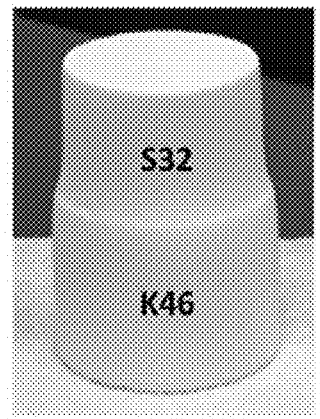
FIG. 2B
FIG. 2D
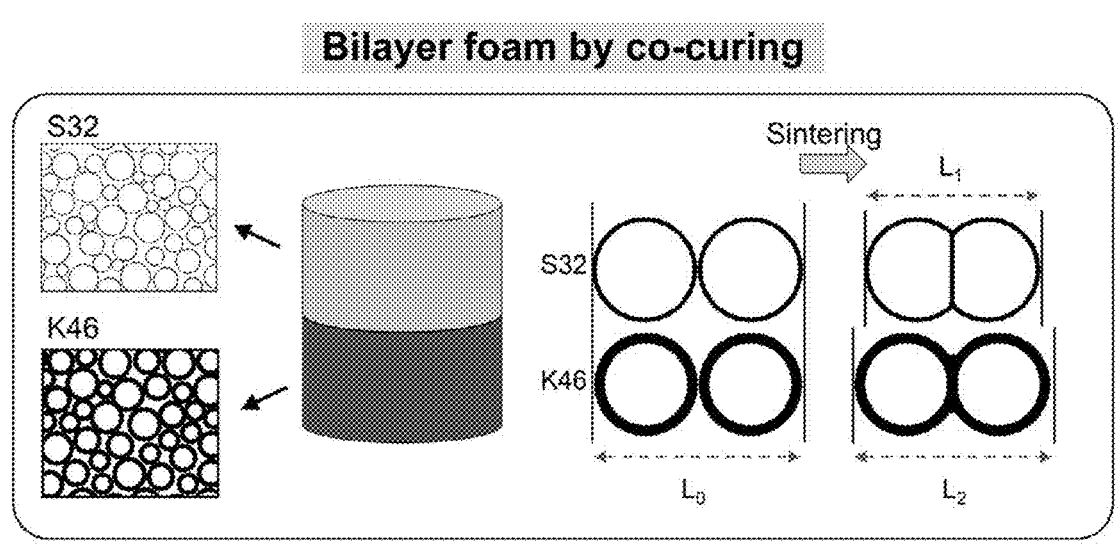
FIG. 2C

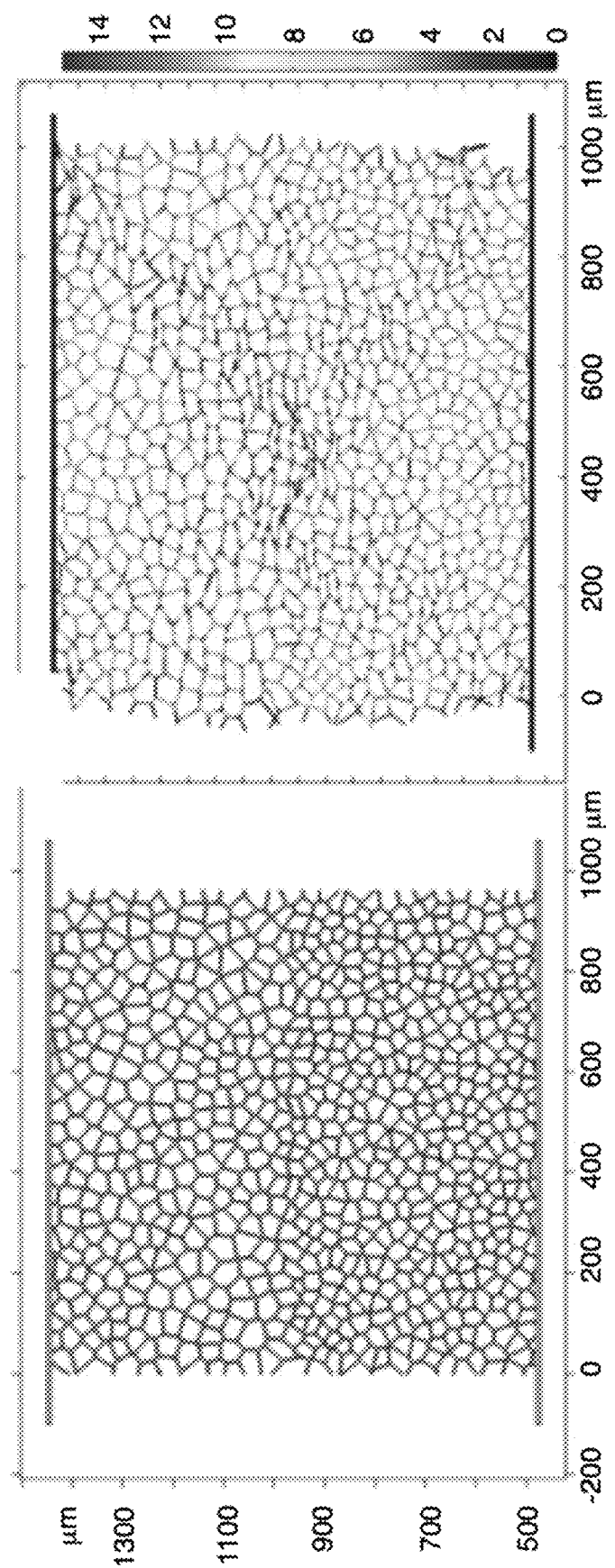

COMPOSITION WITH TUNABLE ENERGY ABSORBING PROPERTIES

CROSS-REFERENCE TO RELATED APPLICATIONS

This application claims the priority to U.S. Provisional Application No. 63/170,270, filed Apr. 2, 2021, which is hereby incorporated by reference in its entirety. Because Apr. 2, 2022, is a Saturday and Apr. 3, 2022, is a Sunday, filing of this application on the next business day, Apr. 4, 202, is timely.

FIELD

The present disclosure relates to cellular foam compositions, and methods for producing and using the same. One aspect of the disclosure relates to a cellular foam composition comprising a plurality of foam layers, where each foam layer is made from a hollow microstructure material. For example, the density of the hollow microstructure material in each foam layer may be different from the density of the hollow microstructure material that forms the adjacent foam layer. In some examples, cellular foam compositions of the present disclosure further include an interfacial layer comprising interfacial voids in between adjacent layers.

BACKGROUND

Energy absorbing materials are used to absorb impacting energy in various applications such as helmet, body armor, and packaging. Different situations have vastly different impact forces and thus the properties of the energy absorbing materials should be designed properly to meet the requirement of the specific applications. For example, injury threshold level is limited to 1.5 MPa for head protective applications. However, as shown in FIG. 1A, a uniform cellular foam often shows a large peak stress, followed by the decrease of stress as the plastic regime begins. Therefore, large stress is transmitted to a person and the energy absorption capacity is lower. Sequential energy absorption allowed by a bilayer structure in FIGS. 1A and 1B would be more efficient in limiting impact stress at lower levels and increasing energy absorption capacity. In addition, there is a tendency that high peak stress is followed by lower plateau stress in uniform foam and thus energy absorption capacity is lower. See FIG. 1B.

Research by others have demonstrated that for a particular density, a cellular foam is most efficient at absorbing the kinetic energy of an impact over a limited range of stress. Therefore, a functionally graded foam may be able to combine a large range of densities to improve the energy absorbing efficiency over a wider range of stress levels. Simulations have also shown that the functionally graded foam is superior in energy absorption compared to a uniform foam.

Cellular foams are widely used in energy absorbing applications, and the foams should be as light as possible and provide maximum energy absorbing capacity. Several functionally graded cellular foams have been fabricated and simulated using hollow spheres with matrix materials-, metal-ceramic composites, and aluminum foam. In general, functionally graded cellular foams showed superior performance over uniform foams.

Functionally graded cellular foams have improved energy absorption, modulus, and strength. However, there have been non-uniform stress concentrations in the material using hollow spheres with matrix (syntactic foam), which may cause catastrophic failure originating in the matrix rich side of the specimen, especially when the matrix is a brittle polymer such as epoxy resins. Additionally, varying the volume fractions of microspheres in a matrix causes a gradient in the coefficient of thermal expansion and moisture absorption, resulting in warping. When the energy absorption capacity is increased by the syntactic foam functionally graded foams, they may still have high peak stress, thus requiring a tradeoff between peak stress and energy absorption so the impact stress can be limited to a lower level.

Accordingly, there is a need for a cellular foam having lower impact stress and larger energy absorption capacity to overcome some of the disadvantages of conventional functionally graded cellular foams.

BRIEF SUMMARY

The present disclosure overcomes many of the disadvantages of some of the conventional functionally graded cellular foams by providing a cellular foam having lower impact stress and larger energy absorption capacity. One particular aspect of the disclosure provides a cellular foam comprising a plurality of layers that are co-cured. In one particular embodiment, the cellular foam is produced using a plurality of layers of hollow microstructure materials where each layer of hollow microstructure material has a different wall thickness or density compared to the adjacent layer.

As the cellular foam composition of the disclosure is compressed, a layer having a thinner wall thickness or lowest density is compressed first, followed by a layer with a next lowest thinner wall thickness or the next lowest density, and so forth. In this manner, cellular foam compositions disclosed herein provide a stepwise stress-strain profile curve.

In some embodiments, the cellular foam composition of the disclosure also includes an interfacial layer comprising interfacial voids. The interfacial voids are located between the two adjacent layers of hollow microstructure materials. When the cellular foam composition having one or more interfacial layers is compressed, the interface layer is compressed first.

One particular aspect of the disclosure provides a cellular foam composition comprising a plurality of layers, wherein said cellular foam composition comprises:
  a first foam layer made from a first hollow microstructure material; and
  a second foam layer made from a second hollow microstructure material, wherein a density of said first hollow microstructure material is different from a density of said second hollow microstructure material.

In some embodiments, the cellular foam composition further comprises an interfacial layer in between said first foam layer and said second foam layer, wherein said interfacial layer comprise interfacial voids. Still in other embodiments, an average width of interfacial voids is at least about 25 µm, typically at least about 50 µm, and often at least 75 µm.

Yet in further embodiments, said first hollow microstructure material and said second hollow microstructure material comprises glass, a metal, a ceramic, a polymer, a nanoparticle, or a mixture thereof.

In further embodiments, an average E-modulus of said cellular foam composition is at least about 150 MPa, typically at least about 200 MPa, and often at least about 250 MPa. It should be appreciated, however, the scope of the disclosure is not limited to these particular average E-modulus. In general, the average E-modulus of cellular foams of the disclosure can vary significantly depending on the particular application or use.

Still in further embodiments, said cellular foam composition has a distinctive multi-step stress strain profile. Yet in other embodiments, said cellular foam composition has a distinctive two-step stress strain profile. The term "multi-step stress strain profile" refers to a graph of stress-strain showing a distinctive plateau and increase. The "plateau" refers to showing or having no significant, i.e., about 20% or less, typically about 15% or less, often about 10% or less, and more often about 5% or less change in stress over at least about 0.2 strain as shown in, for example, FIGS. 4A and 5A under the same testing conditions.

Another aspect of the disclosure provides a method for producing a cellular foam composition having a plurality of step-stress strain profiles, said method comprising:
(a) forming a plurality of layered composition by:
(i) placing a first layer of a first hollow microstructure material having a first density adapted for forming a first cellular foam layer;
(ii) placing a second layer of a second hollow microstructure material having a second density that is different from said first density on top of said first layer adapted for forming a second cellular foam layer;
(iii) optionally adding another layer of hollow microstructure material having an another density on top of said second layer adapted for forming an another cellular foam layer;
(iv) optionally repeating step (iii) by placing another hollow microstructure material on top of said layer of step (iii); and
(b) subjecting the plurality of layered composition to conditions sufficient to form said cellular foam composition comprising a plurality of cellular foam layers, wherein each adjacent cellular foam layer has a different density from each other.

In some embodiments, said cellular foam composition has a distinctive multi-step stress strain profile, and wherein the number of multi-step stress strain profile is n−1 or less, wherein n is the number of cellular foam layers present in said cellular foam composition.

Still in other embodiments, said cellular foam composition comprises an interfacial layer comprising interfacial voids in between said first cellular layer and said second cellular layer and optionally in between any other adjacent cellular layer.

Yet in other embodiments, an energy absorbing property of said cellular foam composition is modified by modifying the thickness of said first cellular layer, thickness of said second cellular layer, thickness of any other cellular layer that may be present, or a combination thereof.

In one particular embodiment, said cellular foam composition is a bilayer cellular foam composition. In some instances, said first hollow microstructure material and said second hollow microstructure material are hollow glass microspheres having a different wall thickness. Still in other instances, said step (b) comprises sintering or co-curing said hollow glass microspheres to produce said cellular foam composition. In particular, sintering or co-curing comprises heating the plurality of layered composition to at least a glass transition temperature of the plurality of layered composition.

Still in other embodiments, said cellular foam composition exhibits at least the same energy absorption as the comparative foam composition. As used herein, the term "comparative cellular foam composition" refers to a same cellular foam composition that is produced using an adhesive rather than co-curing method between the first hollow microstructure material and the second hollow microstructure material. Yet in other embodiments, said cellular foam composition exhibits at least about 10% or more, typically at least about 14% or more, and often at least about 20% or more specific energy absorption than the comparative cellular foam composition.

Yet another aspect of the disclosure provides a glass cellular foam composition produced by a process comprising heating a hollow glass microsphere mixture under conditions sufficient to produce the glass cellular foam composition, wherein said hollow glass microsphere mixture comprises a plurality of layers of co-cured hollow glass microspheres, wherein each layer of said hollow glass microspheres has a different glass wall thickness relative to hollow glass microspheres in an adjacent layer. In some embodiments, said glass cellular foam composition comprises a bilayer of co-cured hollow glass microspheres. Still in other embodiments, said glass cellular foam composition comprises an interfacial layer between layers of said co-cured hollow glass microspheres, and wherein said interfacial layer comprises interfacial voids.

A further aspect of the disclosure provides a device comprising a glass cellular foam composition disclosed herein. In some embodiments, said device comprises a helmet, a body armor, a packaging material, a seat, a vehicle (for air, sea, or ground) component, a structural armor, a vehicle crush structure, an aircraft impact protection, a micrometeoroid shield, a personal protective equipment (PPE), an instrument protection, or other components for use as an energy absorber or a mechanical damper.

BRIEF DESCRIPTION OF THE DRAWINGS

FIG. 1A is an illustrative plot of quasi-static stress-strain behavior of a co-cured bilayer cellular foam and a uniform cellular foam where the peak stress of uniform foam exceeds stress limit ($\sigma_{max}$) while

FIG. 1B is an illustrative plot of quasi-static stress-strain behavior of a co-cured bilayer cellular foam and a uniform cellular foam where both curves are under stress limit ($\sigma_{max}$) and bilayer foam has higher plateau stress.

FIG. 2B is SEM micrographs of the amorphous glass foam microstructure for different durations of thermal processing showing different levels of sintering.

FIG. 2C is a schematic illustration of the co-curing process used to produce multilayer cellular foam using different density hollow spheres.

FIG. 2D is a photograph of a co-cured bilayer amorphous glass foam showing notable differences in shrinkage.

FIGS. 7A-7D are FEM simulations of glass foam with voids at interface and glass foam without voids. The FEM images in FIGS. 7A and 7C show displacement plot before compression and the FEM images in FIGS. 7B and 7D shows Von Mises stress distribution after compression.

DETAILED DESCRIPTION

Figure 1A:
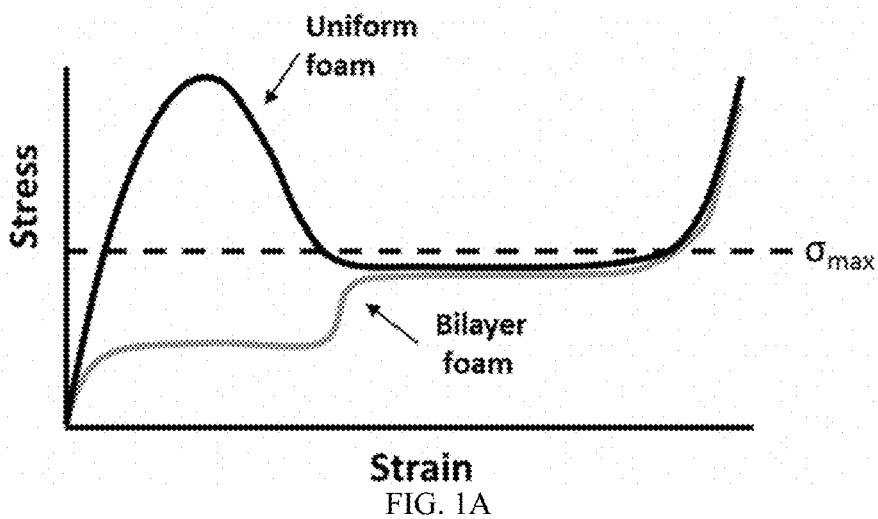

Only a narrow divide exists between harmless and injurious crashes, requiring materials with high energy absorption tuned to the anticipated impact scenarios. As one example, protective headgear, such as helmets, is designed to limit stress to below the 1.5 MPa injury threshold. A number of situations require materials that support a wide spectrum of stress levels. Passenger seats in airplanes, for example, must accommodate all body types, ranging from 5 foot, 110 pound occupants to the 6 foot 2 in., 223 pound occupants. Lighter occupants sitting in a seat designed for the heaviest passenger may experience transmitted stress levels beyond the injury threshold because impact energy is only absorbed in the elastic regime. Conversely, the heavier occupant using a seat designed for the lighter passenger also undergoes large stresses after the onset of densification because insufficient energy has been absorbed.

These impacts often harm the human body and reduce the quality of life for an extended period. All crashworthiness applications, from occupant protection systems in automobiles or aircraft to electronic packaging, will benefit from the development of a material system with tunable energy absorption such that the stroking load is gradually increased, reducing the acceleration and peak stress experienced.

Stimuli-responsive polymer materials, field responsive fluid-impregnated cellular solids, and carbon nanotube arrays have been developed to demonstrate adaptive energy absorption. These concepts often consist of soft materials, such as hydrogels, and require external stimuli, such as magnetic field, mechanical stress, and temperature, to activate the tunable mechanical properties. A functionally graded foam can utilize a density gradient to improve the energy absorbing capacity over a wider range of stress levels. It has been shown that the stress wave profile and amplitude can be tailored by the gradient function that defines the variation in density, which consequently can improve the energy absorption capacity and reduce the damage induced in the object/person. The mechanical response of functionally graded foams can be tuned by altering the local density or by choosing a different cell material. A wide range of materials can be processed with the same fabrication methodology and there is no need for external stimuli to alter energy absorption behavior. The present disclosure provides the ability of functionally graded foams to offer tunable energy absorption exceeding single density alternatives.

The present disclosure will be described with regard to the accompanying drawings, which assist in illustrating various features of cellular foam compositions disclosed herein. In this regard, the present disclosure generally relates to a cellular foam composition comprising a plurality of layers. That is, the disclosure relates to cellular foam compositions that are produced from a plurality of layers of hollow microstructure materials where the density and/or wall thickness of adjacent layers of hollow microstructure materials are different. For the sake of clarity and brevity, the present disclosure will now be described in reference to a bilayer cellular foam composition. However, it should be appreciated that the scope of the disclosure is not limited to merely a bilayer cellular foam composition. In fact, compositions of the disclosure can include cellular foam composition comprising a plurality of layers, e.g., tri-layers, quad-layers, penta-layers, etc. Discussion of a cellular foam composition comprising a bilayer of hollow microstructure materials is provided solely for the purpose of illustrating the practice of the disclosure and do not constitute limitations on the scope thereof.

Hollow glass microspheres (HGM) or other microparticles have been used in syntactic foams or other composite systems as additives to enhance mechanical performance with lowered density. Bilayer foam structures fabricated in a single step ("co-cured") from HGM are used as a representative system due to a wide range of densities already available. The co-cured sample presents a sequential collapse of the constituent layers during compression, manifesting as a step-like progression in the stress-strain profile. Contrastingly, uniform and bilayer laminated samples display yield stress about 2 times larger than co-cured samples followed by lower plateau stress. Despite lower yield stress, the co-cured foams exhibit an energy absorption that is significantly greater than that of the uniform and laminated structures. Finite element method (FEM) simulations indicate that the graded transition layer generates interfacial stress and, thus, generates voids in the vicinity. The voids in the foam, confirmed with scanning electron microscopy (SEM), lower the yield stress and lead to the desired sequential collapse that maintains stress below thresholds. Accordingly, the co-cured functionally graded foam disclosed herein provides versatile tunability in energy absorbing properties by altering the foam material and layer thicknesses while relying on a simple and low-cost manufacturing method.

Some aspects of the disclosure provide compositions with tunable energy absorbing properties. In particular, compositions of the disclosure respond to a range of energy absorption needs in different impact conditions. In particular, cellular foams of the disclosure have a particular energy absorption profile. Such energy absorption profile is achieved by using a hollow microstructure material. Exemplary hollow microstructure materials that can be used in cellular foam compositions of the disclosure include, but are not limited to, hollow glass materials (HGM), hollow microstructure metals (such as aluminum, copper, nickel, titanium alloy, etc.), hollow microstructure ceramics (such as silica, alumina, Silicon carbide, aluminosilicate, Aluminum phosphate, PZT, ZnS, oxide ceramics, hollow microstructure polymers (such as Polystyrene, polyamide, polyurethane, polydivinylbenzene, etc.), other hollow microstructure materials such as Fly ash, as well as other hollow microstructure materials known to one skilled in the art. Typically, microstructure materials used to produce cellular foam compositions of the disclosure are spherically shaped. However, it should be appreciated that other shapes of hollow microstructure materials can be used to produce cellular foams disclosed herein. For example, hollow microstructure material can be tubular or elongated, hexagonal, oval, cubical, pyramidal, egg-shaped, donut-shaped, etc. In fact, it can be of any shape as long as it is hollow and has the shortest width or length as disclosed herein.

As used herein, the term "microstructure" refers to materials having a diameter or a shortest width of about 1 mm or less, typically about 750 µm or less, often about 500 µm or less, more often about 250 µm or less, and most often about 100 µm or less. While the longest length can vary, it is generally about 5 mm or less, typically about 1 mm or less, often about 750 µm or less, more often about 500 µm or less, and most often about 250 µm or less.

When referring to a numerical value, the terms "about" and "approximately" are used interchangeably herein and refer to being within an acceptable error range for the particular value as determined by one skilled in the art. Such a value determination will depend at least in part on how the value is measured or determined, e.g., the limitations of the measurement system, i.e., the degree of precision required for a particular purpose. For example, the term "about" can mean within 1 or more than 1 standard deviation, per the practice in the art. Alternatively, the term "about" when referring to a numerical value can mean±20%, typically ±10%, often ±5% and more often ±1% of the numerical value. In general, however, where particular values are described in the application and claims, unless otherwise stated, the term "about" means within an acceptable error range for the particular value, typically within one standard deviation.

The term "hollow" means having a space or unfilled area or "void" within a fully encapsulated area of the microstructure material.

The wall thickness of the hollow microstructure material used to produce cellular foams disclosed herein is typically about 75 µm or less, often about 50 µm or less, more often about 25 µm or less, still more often about 10 µm or less, and most often about 5 µm or less. Alternatively, the wall thickness of the hollow microstructure material used to produce cellular foams disclosed herein is typically about 50% or less, often about 25% or less, more often about 10% or less, and most often about 5% or less of the shortest width, length, or diameter of the hollow microstructure material.

The term "adjacent layer" refers to a boundary between two hollow microstructure materials having different wall thickness or density.

In some embodiments, the cellular foam composition of the disclosure also includes an interfacial layer comprising interfacial voids. When present, the interfacial layer is located between two adjacent layers, i.e., between two layers of hollow microstructure materials with different density and/or wall thickness. It should be appreciated that when three or more layers of hollow microstructure materials are used in producing cellular foam compositions of the disclosure, the interfacial layer can be present between each of the adjacent layers of different hollow microstructure materials or the interfacial layer can be present only within some of the adjacent layers.

In some embodiments, an average width of the interfacial void is at least about 50 µm, typically at least about 100 µm, often at least about 200 µm, and most often at least about 250 µm. The term "interfacial void" refers to a space or unfilled area or "void" within the foam that is present between two adjacent layers. It does not refer to hollow, i.e., encapsulated, space in the original hollow microstructure material. Alternatively, the term "interfacial void" refers to a space between two hollow microstructure materials within the interfacial layer. The term "width" when referring to interfacial void refers to the distance in space between hollow microstructure materials and the term "length" refers to the distance between two layers of hollow microstructure materials having different density.

The term "cellular foam" refers to a material having individual cells or hollow microstructures whose individual walls of fully encapsulated microstructures are attached or bonded together.

In some embodiments, methods disclosed herein introduce large interfacial voids at the interface of different hollow microstructure material layer(s). This can be achieved, for example, by sintering different hollow microstructure materials (e.g., hollow glass microspheres, see FIG. 2A) with different wall thicknesses. When the hollow glass microspheres come in contact with adjacent spheres under sintering temperature, they start to consolidate via various mass transport mechanisms in a viscous manner above their glass transition temperature ($T_g$), FIGS. 2B and 2C. The spheres with different wall thicknesses show different shrinkage rates during the sintering process (FIG. 2D), resulting in localized stresses at the interfaces. This localization of stress leads to the formation of large voids and thus crack propagation starts at the interface under compressive force, leading to low yield stress.

Typically, cellular foam compositions of the disclosure are produced by curing the mixture such that the hollow microstructure materials reach a glass transition temperature thereby leading to fusing or bonding of the walls of hollow microstructure materials. For the sake of brevity and clarity, the present disclosure will now be illustrated with regard to producing cellular foam compositions comprising hollow glass microspheres. However, as stated above, the scope of the disclosure encompasses producing cellular foam compositions produced from other hollow microstructure materials.

Figure 3:
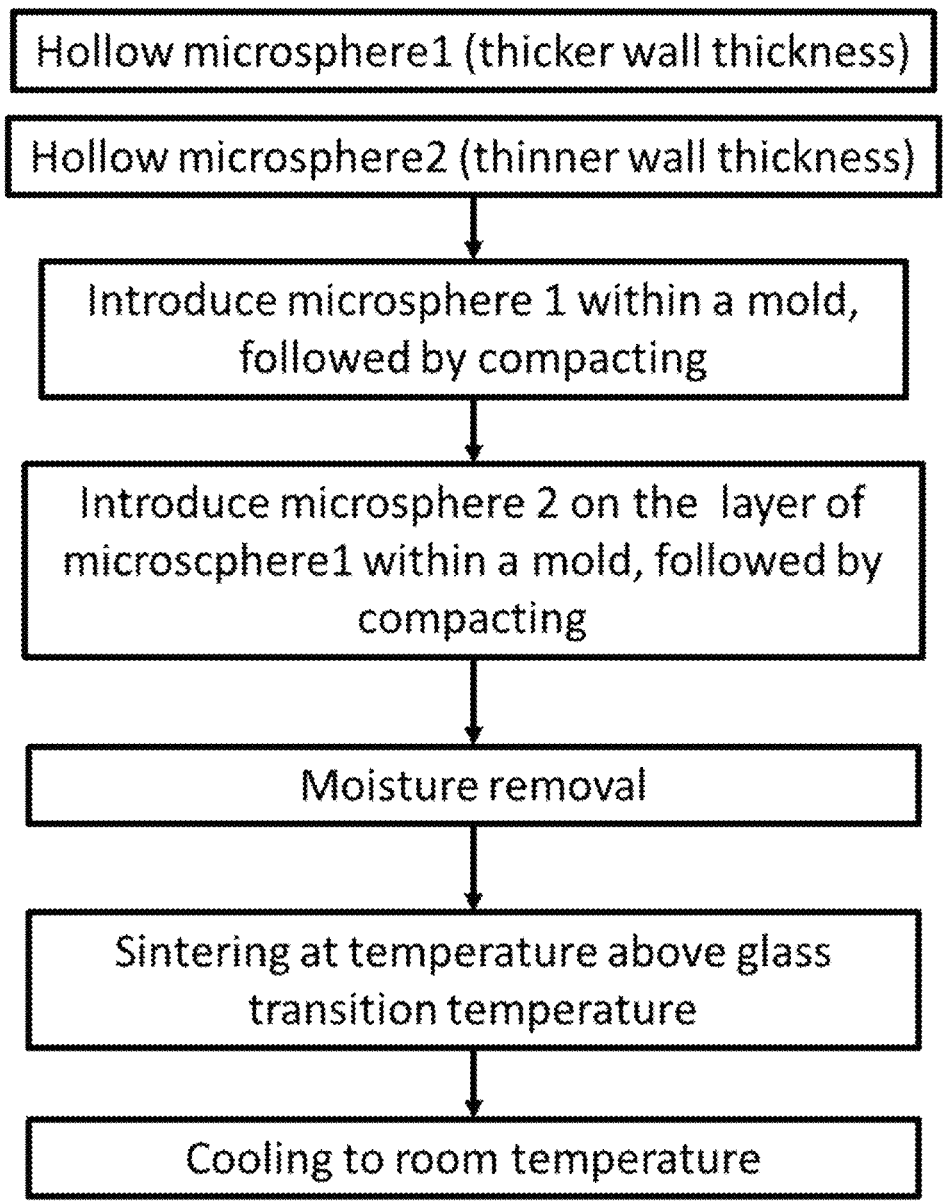
FIG. 3 is a flow diagram showing an example for producing a cellular foam composition using hollow microsphere materials in accordance with examples of the present disclosure.

In one particular embodiment, hollow glass microspheres (HGMs) with different wall thickness and densities are co-cured or sintered to produce a bilayer cellular foam using a process illustrated in FIG. 3. Co-curing of HGMs typically involves sintering of the hollow glass microspheres at or above the glass transition temperature. In some embodiments, co-cured cellular foam composition included localized voids, i.e., interfacial voids. The average width of the interfacial voids is at least about 20 μm, typically at least about 30 μm, often at least about 40 μm, and most often at least about 50 μm. Alternatively, the average width of the interfacial voids is about at least 100%, typically at least about 125%, often at least about 150%, and most often at least about 200% of the diameter or the shortest width or length of the hollow microstructure material.

Without being bound by any theory, it is believed that the interfacial voids are formed locally at the interface due to a different shrinkage rate of HGMs. By varying the wall thickness of the HGMs, the amount of HGMs, and/or the ratio of different HGMs, one can readily produce cellular foams having different energy absorption characteristics.

Figure 1B:
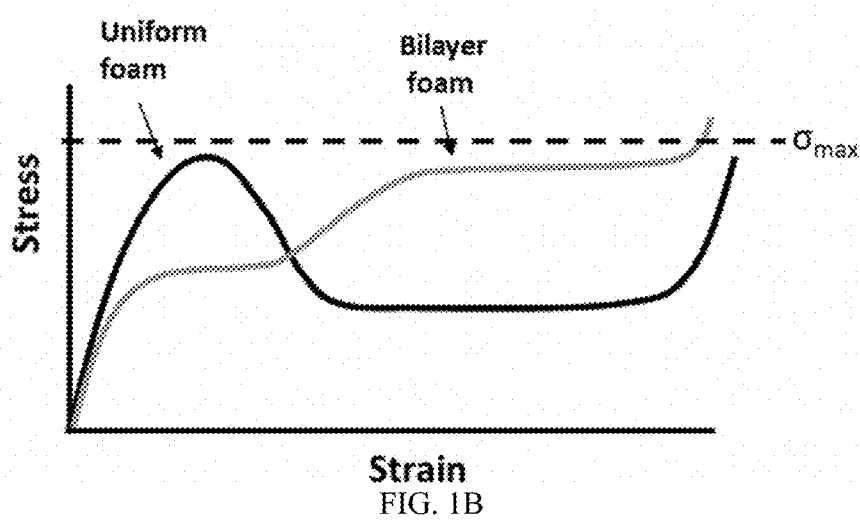
FIG. 1(b) shows that both curves are under stress limit ($\sigma_{max}$) and bilayer foam has higher plateau stress.

Mechanical testing showed that the presence of interfacial voids leads to a sequential collapse of the layers, resulting in a distinctive two-step stress/strain profile. See, for example, FIGS. 1A and 1B. For comparison, bilayer samples were fabricated using epoxy adhesive. These samples show a different mechanical response from the co-cured cellular foams of the present disclosure by not showing the two-step stress-strain profile. The co-cured cellular foam compositions of the disclosure exhibited at least about 5% or more, typically at least about 10% or more, and often at least about 15% or more specific energy absorption than epoxy bonded samples. The results indicate that cellular foam compositions of the disclosure can limit impact stress and achieve a higher energy absorption capacity than the corresponding epoxy bonded samples. The term "corresponding epoxy bonded sample" refers to a composition having the same HGMs but are epoxy bonded without co-curing or sintering.

The cellular foam compositions of the disclosure can be used in a wide variety of application including in the areas of blast/impact reduction. Exemplary uses of cellular foam compositions of the disclosure include, but are not limited to, packaging material to prevent breakage of items or equipment, seats (e.g., in automobiles and aircrafts, etc.), sporting equipment (e.g., helmets, gloves, knee braces, football paddings, etc.), other protective gears (e.g., construction helmets, body armor or padding, etc.), automobile or airplane interiors (e.g., dashboards to reduce impact energy, etc.), energy absorbers, mechanical dampers, and other devices and equipment where impact or blast energy reduction is useful.

Yet in further aspects of the disclosure, a method for dry powder printing (DPP) hollow microstructure materials is provided. In this manner, cellular foam compositions are produced using the DPP process. Briefly, the DPP process of the disclosure includes using, for example, a 3-D printing technology. Typically, each layer of hollow microstructure materials are dispensed into a desired shape using a 3-D printer and co-cured to produce a three-dimensional material having a cellular foam composition of the disclosure.

Additional objects, advantages, and novel features of this disclosure will become apparent to those skilled in the art upon examination of the following examples thereof, which are not intended to be limiting. In the Examples, procedures that are constructively reduced to practice are described in the present tense, and procedures that have been carried out in the laboratory are set forth in the past tense.

EXAMPLES

Example 1

Cellular Foam Composition Fabrication: Two different hollow soda-lime-borosilicate glass microspheres (S32 and K46, 3M St. Paul, MN) were the feedstock material used in the fabrication of the cellular foam composition. The size distribution and wall thickness of the microspheres was characterized with a scanning electron microscope (SEM) (TESCAN, VEGA-II), followed by post image analysis. 4 sets of samples were prepared (uniform S32, uniform K46, co-cured bilayer S32/K46 and epoxy bonded bilayer S32/K46). Each set included 5 samples. The cellular solids samples were fabricated as follows.

Microspheres were introduced into a stainless-steel mold (67 mm inner diameter and 150 mm in height) and the mold was tapped 300 times to settle the microspheres before moisture removal in a furnace. For the bilayer samples, the first layer of microspheres was added, followed by tapping 300 times and the second layer of microspheres was added, followed by 300 taps. A box furnace (Mellen, Concord, NH) was used to remove moisture and sinter the spheres in the molds. The temperature of the furnace was ramped up to 150° C. and soaked for 120 min to drive off moisture from the sample. The molds were taken out of the furnace for another 300 taps and then the molds were put back in the furnace for sintering. The temperature was then ramped to 600° C. for 180 min for uniform thermal distribution. The temperature was raised to bonding temperature 840° C. with slow ramp rate (0.5° C./min). Bonding soak time of 20 min was applied. After the bonding process, the temperature started to decrease down to 560° C. with ramp rate (0.5° C./min) and followed by 360 min of annealing process to relieve residual stress in the sintered foams. Finally, the temperature is decreased to room temperature at 0.5° C./min.

Mechanical testing: All the testing samples were carefully machined into several cubic samples (2.5×2.5×2.5 cm³) for uniaxial compression testing. Co-cured bilayer samples were carefully machined so a 1:1 volume ratio of both layers was presented in a sample and the interface is located in the middle of a sample. For the epoxy bonded sample, smaller size rectangular samples (2.5×2.5×1.25 cm³) were machined for each S32 and K46 material. The half cubic samples of S32 and K46 were glued together with epoxy (Loctite epoxy). 0.03 to 0.05 g of epoxy was smeared to the interface to make bilayer samples and cured for 24 hrs. The width, height, and weight of each sample were measured to calculate the density of each sample. Quasi-static uniaxial compression testing was performed using a loading stand (MTS, Eden Prairie, MN) at ~$10^{-3}$/sec strain rate. Movies of samples during the compression test were recorded using a camera (Nikon D5100. AF Micro-Nikkor 200 mm f/4D IF-ED). Post measurement analysis of the compression testing produced stress-strain curve values from which critical mechanical properties, such as energy absorption and yield strength were obtained. Frequently, stress-strain curves show that the stress change from elastic to plastic behavior is not distinctive, thus the offset yield method was used to determine the yield strength.[13] Therein, a line is constructed parallel to the initial linear region of the stress-strain curve but offset by 0.2% from the origin. The 0.2% offset yield strength, $\varepsilon_y$, is the stress at which the constructed line intersects the stress-strain curve.

Scanning Electron Microscopy: To observe its microstructure, cellular solid samples were cleaved and observed in the SEM, followed by post image analysis. ImageJ was used for estimating the area fraction of voids from the SEM images of the cross-sectional cellular foams. Binary 8-bit SEM images using Phansalkar threshold method allowed distinguishing voids and cellular structure and then a particle analysis tool was used to calculate the area of voids.

Finite element method simulations: Finite element modeling was performed with COMSOL Multiphysics to visualize the interfacial stress of the bilayer. The volume change coefficients for S32 and K46 were obtained with the experimentally obtained volume changes in terms of temperature. To model the densification of bilayer foam, the volume change coefficient was implemented in place of the thermal expansion coefficient. To simulate compression via FEM, accurate 2D representations of the co-cured microstructure were mimicked within the FEM model. The SEM images establish that K46 has, on average, 1.3 times more cells per unit area and thus the Voronoi structure was constructed with the different cell numbers and size for S32 and K46.

Result and Discussion

Figure 2A:
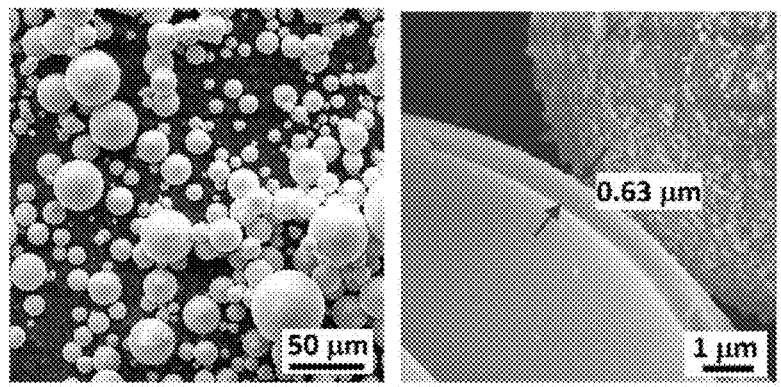
FIG. 2A is SEM images of hollow glass spheres and their corresponding wall thickness.
Figure 2E:
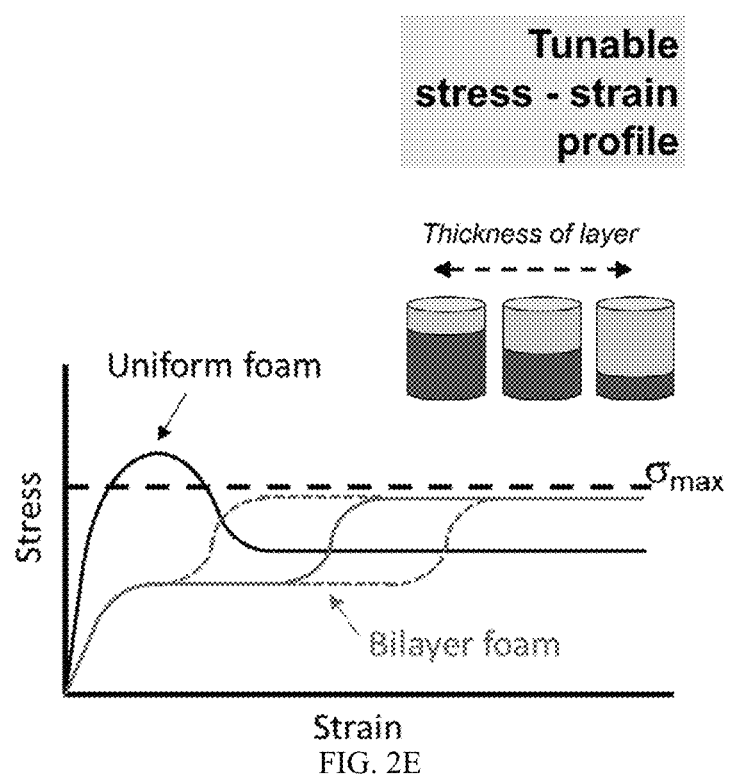
FIG. 2E shows qualitative depiction of the stress-strain characteristics of uniform and bilayer foams. The dashed curves represent the tunable loading profile obtained at different layer thicknesses.

Hollow glass microspheres (HGM) were used to fabricate functionally-graded bilayer foams with tunable stress strain profiles and increased specific energy absorption. FIGS. 2A-2E. HGM provides a model system for investigating the mechanics of graded structures, given their strength-to-weight ratio and wide range of diameters (10 to 100 µm) and wall thicknesses (0.5 to 2.0 µm) readily available from commercial sources (FIG. 2A).

Amorphous glass foam was fabricated via sintering of the HGM with adjacent microspheres consolidating via mass transport at their contact points when raised above their glass transition temperature ($T_g$, FIG. 2B). Spheres with different wall thicknesses (FIG. 2C) present different degrees of shrinkage ($L_0$-$L_1$>$L_0$-$L_2$) during thermal processing. Therefore, simultaneously sintering ("co-curing") multiple types of hollow spheres with different true density and wall thickness yields: (i) a gradient in density and (ii) an interfacial stress between the layers of different spheres due to the different shrinkage rate (macroscopically observed—FIG. 2D).

The interface stress is accompanied by the formation of large voids. As the graded foam structure is loaded under compression (FIG. 2E), the individual layers sequentially collapse and present a step-like behavior in the stress-strain profile. By contrast, uniform foams often display a larger yield stress and lower plateau stress. To explore the mechanical tunability, bilayer amorphous glass foams were fabricated from a combination of S32 and K46 HGMs. S32 and K46 are made of the same material with the same diameter distribution. The true density of the spheres is 0.32 and 0.46 g cc$^{-1}$ for S32 and K46, respectively, and their average diameter of spheres is 40 µm, indicating that their average wall thicknesses are different (1.01 µm for S32 and 1.48 µm for K46). Co-cured bilayer foams are subjected to quasistatic ($10^{-3}$ s$^{-1}$ strain rate) uniaxial compressive load. The mechanical performance of the co-cured and laminated bilayer foams was further investigated to understand the impact of the interfacial voids on the loading response (FIGS. 4A-4D). The stress-strain curves from quasistatic compression testing reveal average E-moduli of 221.6 and 165.5 MPa for the co-cured and the epoxied foams, respectively (Table 1).

TABLE 1

Measured onset densification, density, modulus, yield strength, absorbed energy, and specific absorbed energy

|  | $\varepsilon_d$ | Density (kg/m³) | Modulus (MPa) | Yield Strength (MPa) | $U_v$ (MJm$^{-3}$) | $U_m$ (kJ kg$^{-1}$) |
| --- | --- | --- | --- | --- | --- | --- |
| S32 | 0.62 ± 0.01 | 443.7 ± 9.5 | 241.8 ± 57.7 | 4.5 ± 0.3 | 2.2 ± 0.1 | 4.9 ± 0.2 |
| K46 | 0.64 ± 0.01 | 407.8 ± 4.9 | 275.7 ± 41.1 | 4.8 ± 0.5 | 2.3 ± 0.1 | 5.7 ± 0.1 |
| Co-cured | 0.64 ± 0.01 | 432.0 ± 6.5 | 221.6 ± 77.2 | 1.9 ± 0.5 | 2.4 ± 0.1 | 5.5 ± 0.2 |
| Epoxy | 0.63 ± 0.02 | 426.5 ± 3.4 | 165.5 ± 31.4 | 4.4 ± 0.2 | 2.0 ± 0.0 | 4.8 ± 0.2 |

Despite the epoxy's modulus of 1-5 GPa, the laminated foam still presents a 25% reduction in modulus. Even though epoxy has a higher modulus, a negligible amount was applied to bond the bilayer foam. Even though the samples are machined thoroughly to have flat surfaces, there could still be unevenness and possibly small microgaps at the interface. Therefore, less force is required to compress the material, resulting in a lower modulus.

As compression proceeds, the co-cured foam starts to show plastic yielding at ~3 MPa, followed by a long plateau stress. The epoxy-bonded sample behaves differently, with its stress rising steeply to 5.5 MPa. Different mechanical responses between the two samples continue in the plateau stress regime. The co-cured sample shows a distinctive stepwise change in stress corresponding to the bilayer interface. During this transition, the first plateau stress at around 3 MPa lasted through around 0.33 strain where another linear elastic regime appears. The second elastic stress starts to yield around 5.0 MPa and the second plateau stress continues. The epoxy bilayer foam starts plastic deformation at 5.5 MPa and its plateau stress decreases with plastic straining.

Brittle collapse of the microcellular structure is known to contribute to the plastic deformation which explains the long decreasing plateau stress. The breaking of the relatively thin wall faces and the wall edge also contributes to brittle collapse of the microstructure. This process contributes to the energy absorbing capacity of cellular foam at a given plateau stress. The plateau stress shows a small elevation between 0.3 and 0.4 strain, followed by densification at 0.65 strain. This small stress elevation can be explained by a combination of densification of the top layer and brittle collapse of the bottom layer.

Figure 4A:
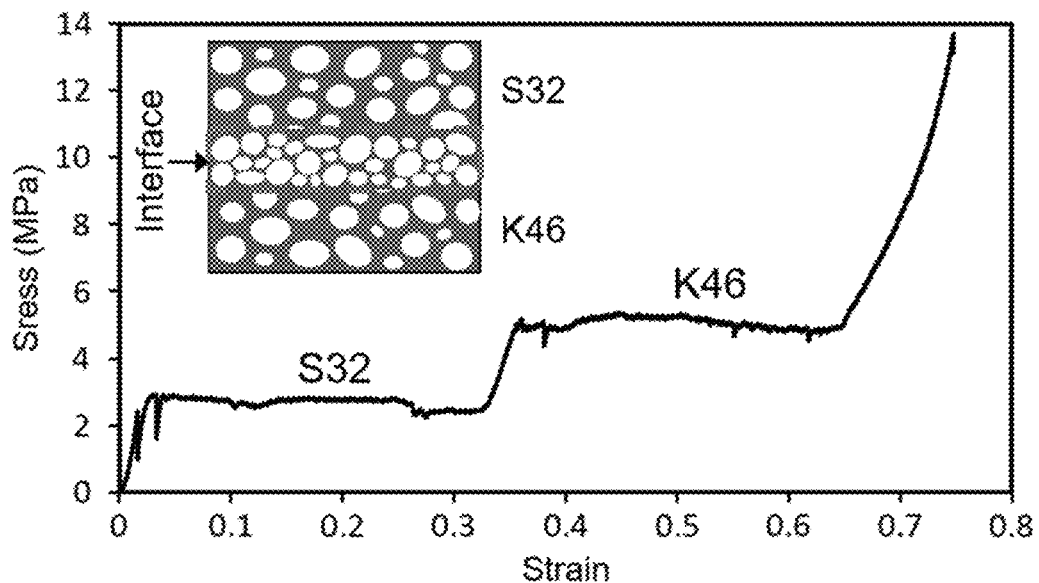
FIG. 4A shows a stress-strain curve of a co-cured bilayer structure.
Figure 4B:
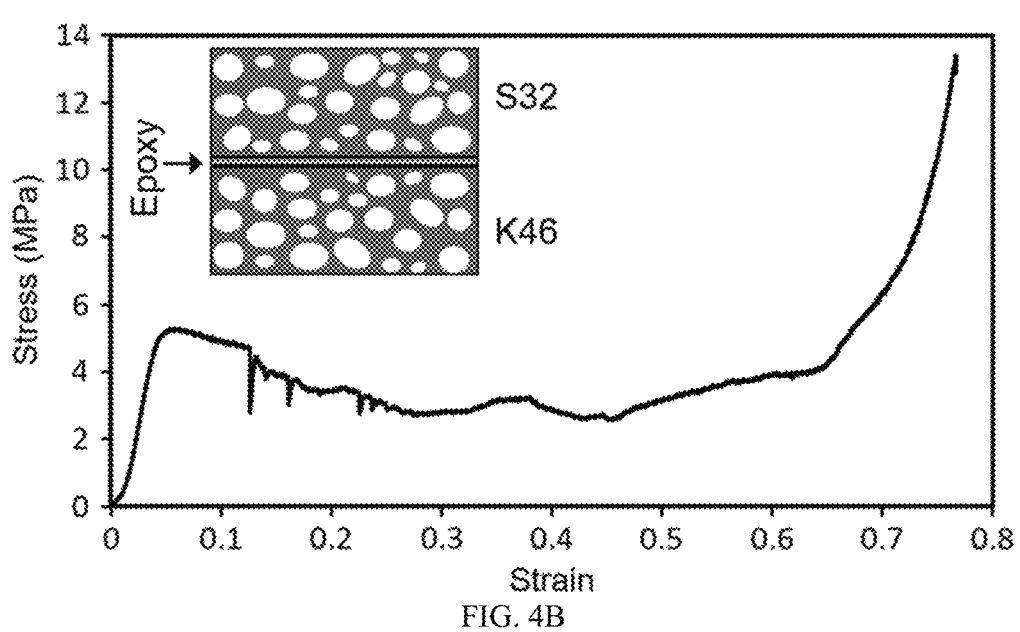
FIG. 4B shows a stress-strain curve of a bilayer cellular structure produced with epoxy.
Figure 4C:
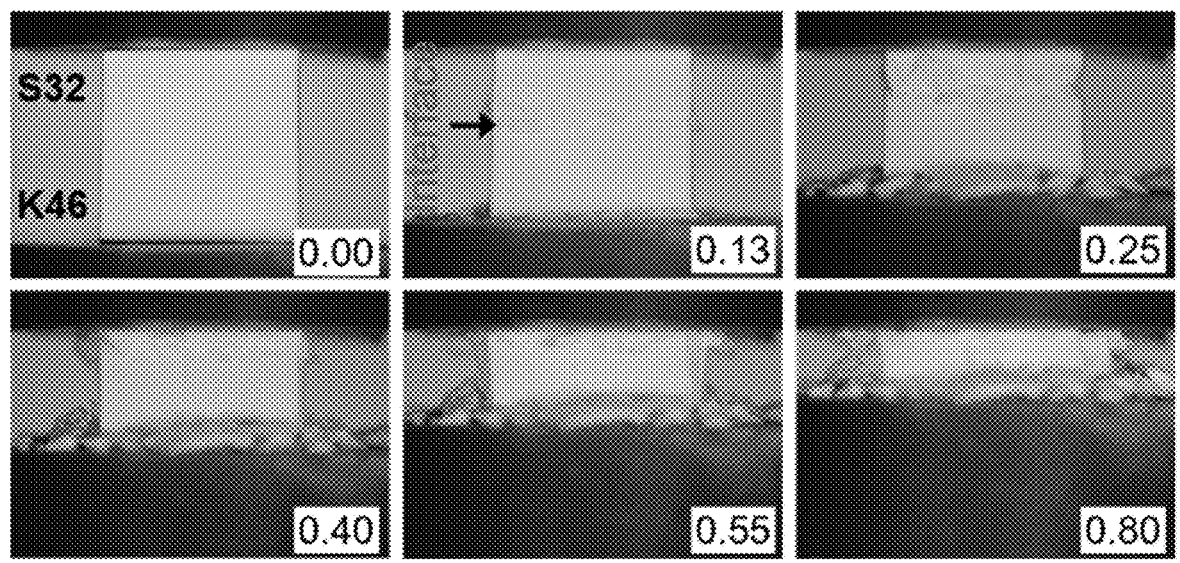
FIG. 4C shows images of compression testing of co-cured samples. Numbers in the images indicate strains.
Figure 4D:
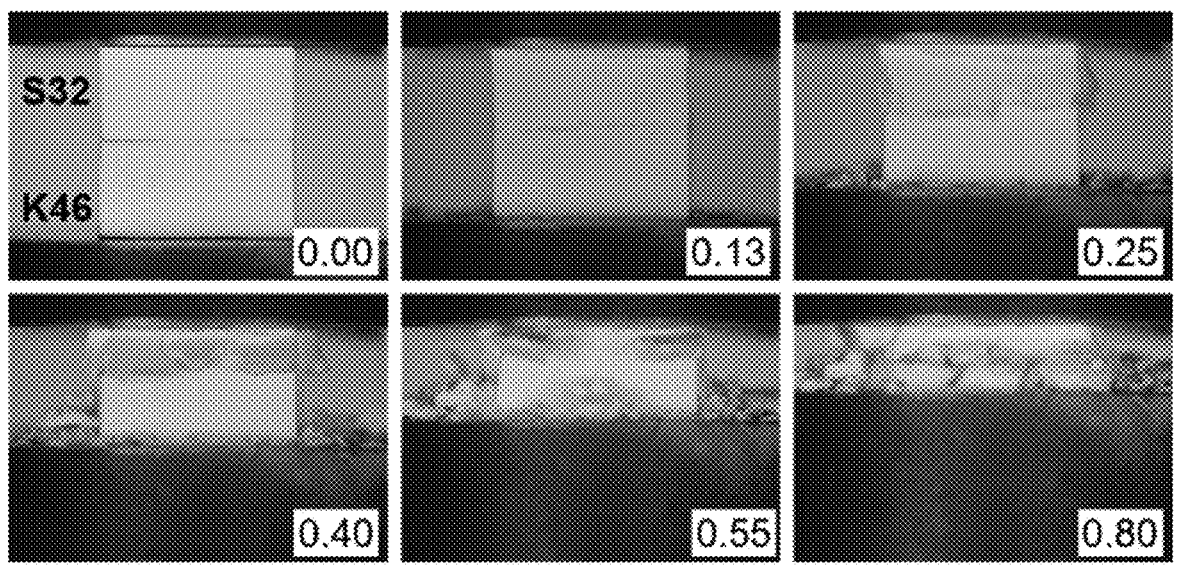
FIG. 4D shows images of compression testing of a bilayer sample produced with epoxy. Numbers in the images indicate strains.

Both bilayer foams show onset densification strain ($\varepsilon_d$) values in the range $0.62<\varepsilon_d<0.64$. FIG. 4C shows the images of compression testing of the co-cured foam at different strains, indicating that the interface appears in the middle of the foam at strain 0.13. As compression continues, the S32 layer is completely compressed while the K46 is barely compressed, indicating that the first plateau stress is caused from mostly by the S32 layer. FIG. 4D shows that the epoxy bonded sample also collapses in sequence such that the S32 layer compresses prior to the K46 layer. Generally, the epoxy-bonded sample had relatively larger pieces of the foam spall and more sidewall spallings compared with the co-cured sample. The contrast in the compressive stress profiles between the two samples is attributed to different interface defect densities, as investigated later.

Figure 5A:
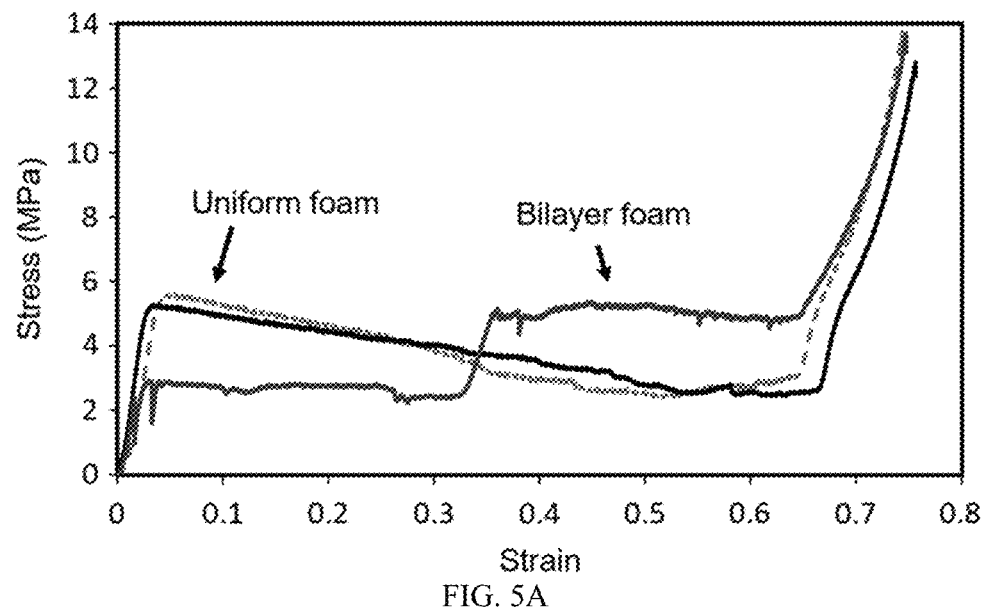
FIG. 5A shows stress-strain curves of uniform S32, K46 foam and bilayer foam from compression tests.
Figure 5B:
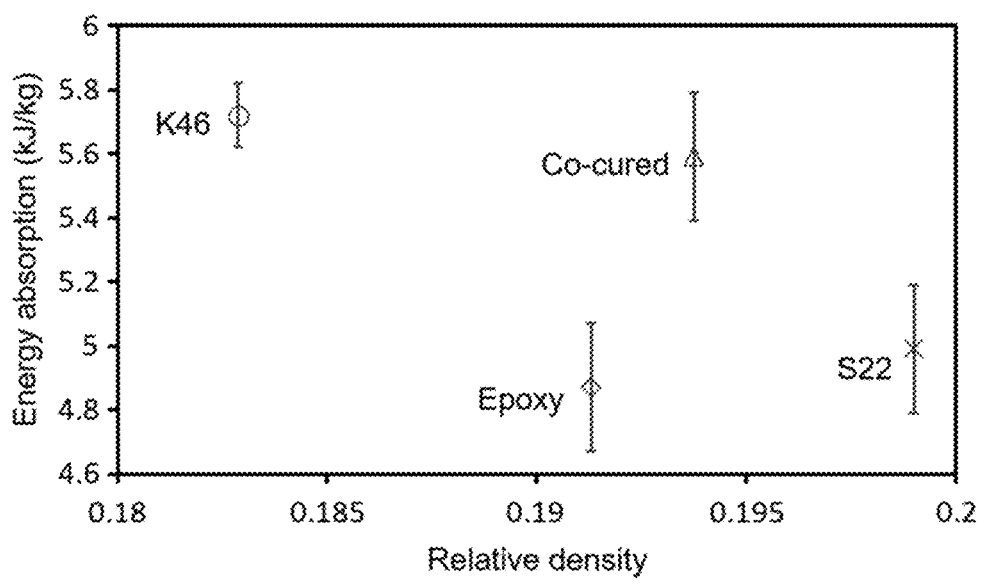
FIG. 5B is a graph showing the energy absorption of each foam as a function of relative density.

The stress-strain behavior obtained from compression testing reveals a strong contrast between uniform and layered amorphous glass foams (FIG. 5A). The behavior throughout the linear elastic regime presents average Young's moduli of 241.9 and 275.7 MPa for S32 and K46 uniform foams, respectively. These values agree well with Gibson-Ashby prediction with porosity of a foam when applied to foams for only higher pore volume fractions (porosity >70%). The yield strengths for both samples are around 5.5 MPa and followed by the long continuing plateau stress. Brittle collapse of a relatively thin micro cellular structure, such as wall face and wall edge, contributes to the long decreasing plateau stress. After the brittle collapse, the stress rises steeply after reaching onset densification ($\varepsilon_d$). As the S32 foam is slightly denser, the average $\varepsilon_d$ value is 0.62 for S32 and 0.64 for K46 (Table 1). As the densities of both foams are similar, the mechanical response observed in both foams shows similar behavior. As shown in FIG. 5A, uniform foam and bilayer foam show different stress-strain profiles. The first lower plateau stress of bilayer is contributed from the collapse of S32, but it is lower than the stress of uniform S32 foam. The result can be explained with the interface with larger voids that induces crack formations and propagation through the S32 layer, resulting in lower plateau stress. As the second plateau stress reached nearly 5 MPa, it is believed that the interface does not affect the K46 layer.

The mechanical performance of these foams is quantified using total energy absorption capacity per unit volume ($U_V$) and energy absorption capacity per unit mass ($U_m$), respectively. The importance of either two parameters depends on whether a specific application requiring a lightweight cellular structure is constrained by volume or weight. Energy absorption capacities per unit volume ($U_V$) of these foams, also known as the energy absorption density, were calculated using Equation (1). The initial linear elastic region absorbs little energy, while the long plateau of the curve indicates large energy absorption via plastic collapse of the cellular structure. The work per unit volume in deforming the cellular foam is simply the area under the stress-strain curve up to $\varepsilon_d$ and energy absorption per unit volume ($U_V$) can be expressed as $$U_V \int_0^{\varepsilon_d} \sigma d\varepsilon \qquad (1)$$

where $\varepsilon_d$ was determined from the energy absorption efficiency plot. Energy absorption efficiency is defined as the energy absorbed at a given applied stress to the sample. Energy absorption capacity per unit mass ($U_m$) is calculated using Equation (2).

$$U_m = \frac{U_V}{\rho} \qquad (2)$$

$U_m$ was obtained by dividing $U_V$ with the density of the cellular foam. $U_m$ is also known as the specific energy absorption.

Figure 5C:
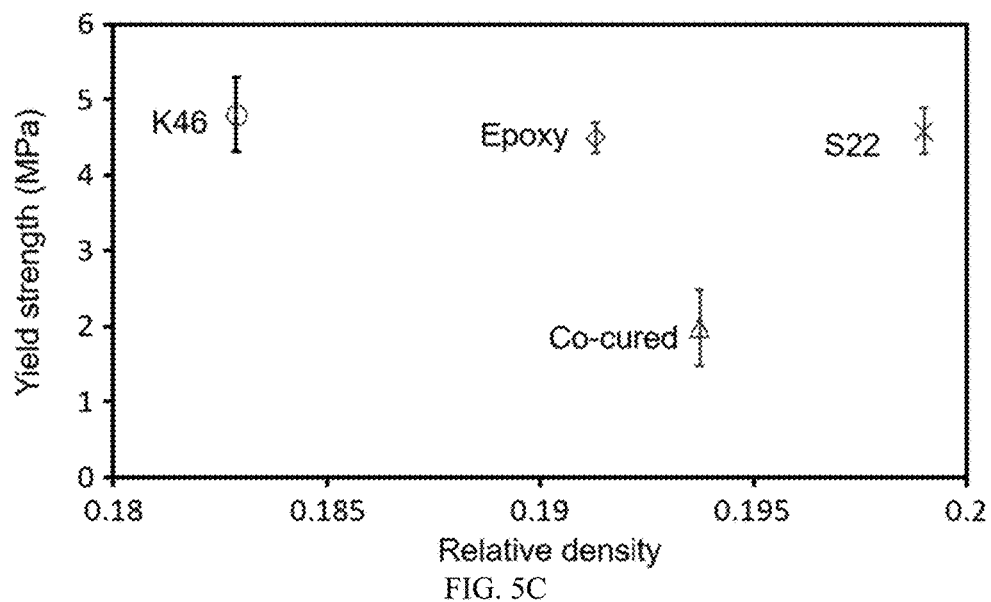
FIG. 5C is a graph showing the yield strength of each foam as a function of relative density.

The co-cured samples showed 5.5 kJ kg$^{-1}$ and it is ~14.0% and ~12.0% more specific energy absorption than the epoxy-bonded and uniform S32 samples, respectively (Table 1). The gradual collapse of the co-cured foam allows for more energy absorption. On the contrary, the epoxy-bonded foam absorbs less energy due to the abrupt collapse. The yield stress (FIG. 5C) displays a contrasting trend, with the co-cured foam displaying 1.9 MPa yield stress compared with the other foams showing over 4 MPa. The co-cured bilayer has the advantage of limiting impact stress without lowering energy absorption.

While the results of compression tests suggest these materials can be tunable such that the peak stress can be kept below a specified injury threshold level, it is important to maximize energy absorbing capacity. Individual uniform S32 and K46 foams were fabricated through a sintering process at 840° C. and the dimension and density were measured. During sintering, consolidation of spheres occurs and the consolidation depends on soaking time and temperature. After they were sintered at 840° C., the dimensional changes were measured, indicating that S32 foam shows about 23% shrinkage in diameter and K46 shows about 12% decrease in diameter. Taking a bulk density of 2.23 g ($\rho s$) for a soda-lime-borosilicate glass and relative density ($\rho/\rho s$) of S32 and K46 foams are 0.09 and 0.13 before sintering, respectively. After sintering, their relative densities were found to be 0.19 for S32 foam and 0.18 for K46 foam.

The volume and density of the sintered foams changed significantly due to the consolidation between adjacent spheres. The consolidation occurs through mass transfer of the amorphous spheres with viscous plastic flow considered as the primary mass transfer mechanism at elevated temperature. Initially, spheres are at point contact, followed by neck growth via mass transfer as sintering proceeds, resulting in consolidation. The mass transfer occurs toward a neck between spheres and thus shrinkage ($L/L_0$) is inversely proportional to the radius of spheres. The relationship between shrinkage and sphere size shows a similar pattern for hollow spheres and molecular dynamic modeling was performed to demonstrate the relationship. It was observed that the thinner walled spheres consolidated faster, eventually causing more reduction in the volume of the entire S32 foam. S32 and K46 co-cured to form a bilayer and the difference in the thermally induced shrinkage produced stress at the interface.

Figure 6A:
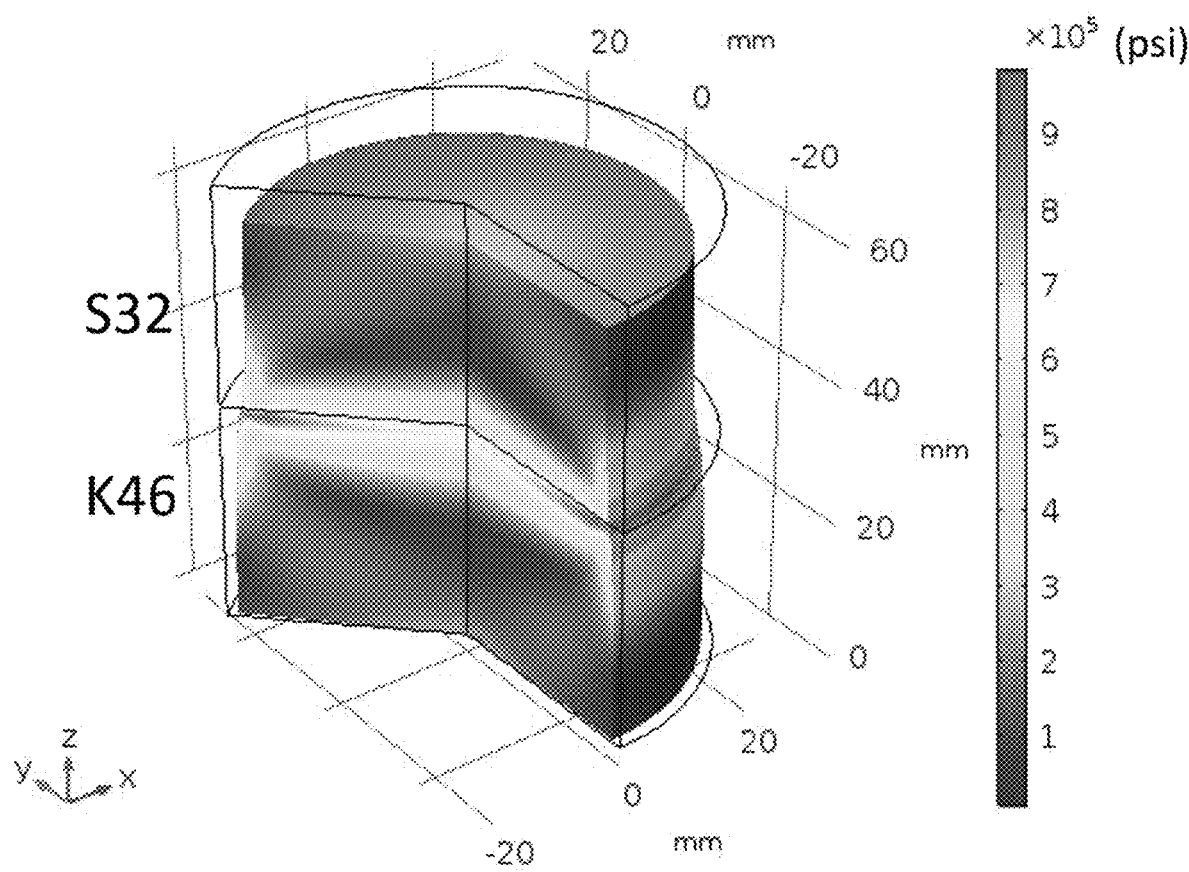
FIG. 6A shows the FEM result of thermally induced stress of bilayer foam.

FEM simulations were used to visualize the interfacial stress that controls the stress-strain profile for bilayer foams. FIG. 6A is a Von Mises stress plot showing the sintered bilayer foam geometry. The FEM result shows that the bilayer shrinks differently and stress is formed at the interface which can induce voids formations. The stress at the interface exceeds the reported isostatic crush strength of individual spheres. The isostatic crush strength of K46 is 41.4 MPa and is 3 times larger than that of S32 at 13.7 MPa. The interfacial stress forms as spheres consolidate which likely results in an asymmetric increase in the probability of crack formation in the S32 layer compared with the K46. SEM images reveal a difference in void densities across the bilayer interface. The difference in wall thickness leads to varying rates of shrinking for the S32 and K46 foams.

Figure 6B:
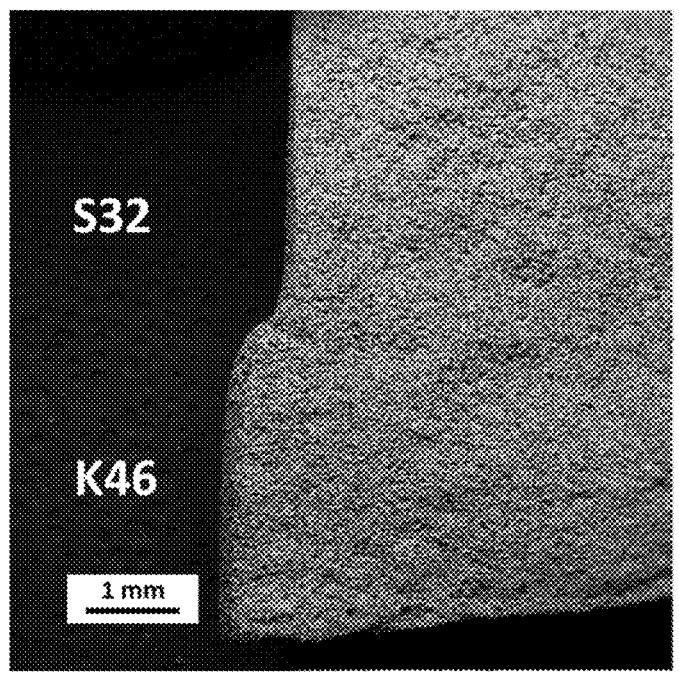
FIG. 6B shows an SEM micrograph of the bilayer sample.
Figures 6C, 6D:
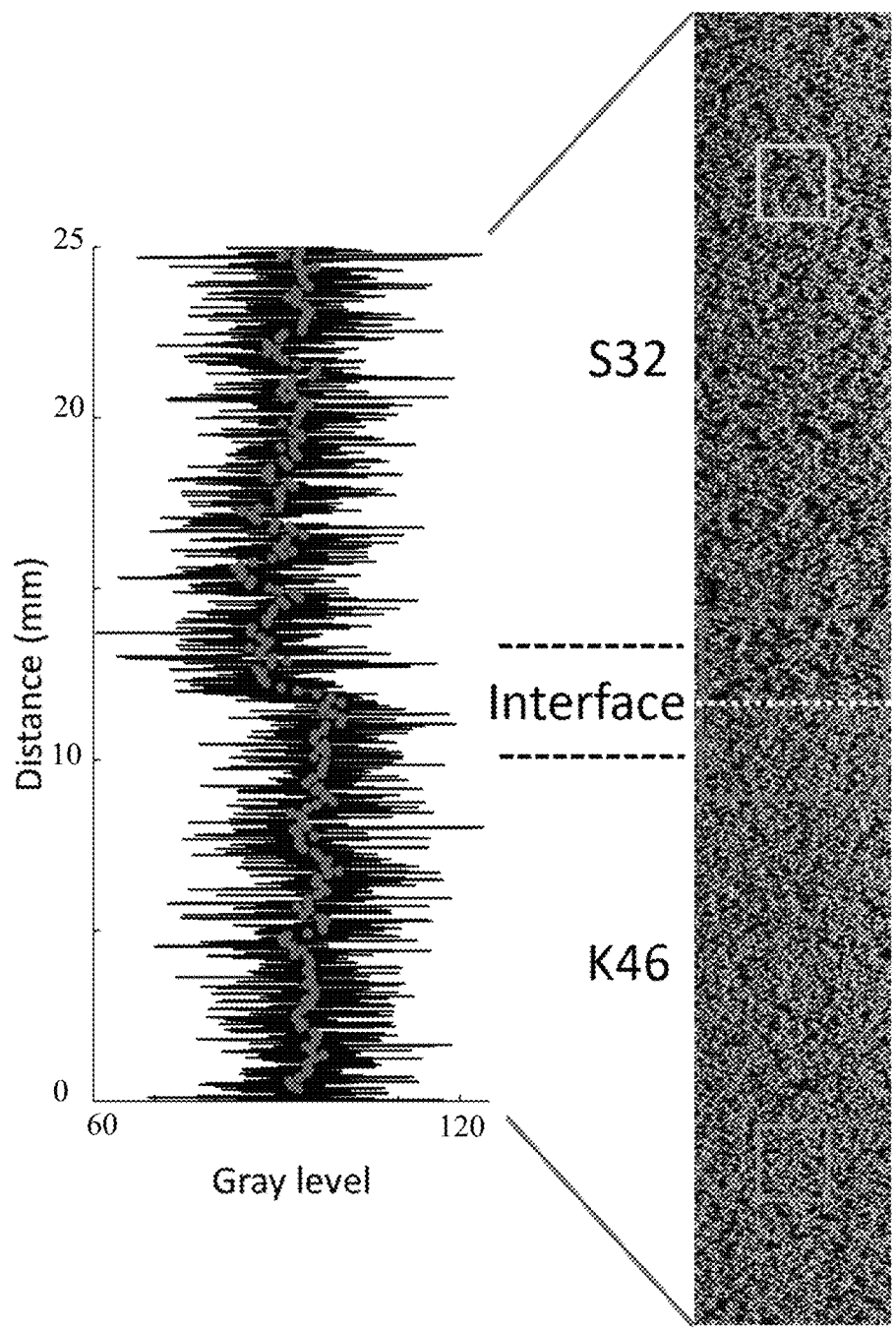
FIG. 6C is a plot profile (the dotted-line in the middle presents the moving average).
FIG. 6D is an SEM image of an interfacial area of the bilayer foam.

FIG. 6B shows a cross section of the co-cured bilayer foam displaying macroscopically visible shrinkage from sintering with the level of contraction inversely correlated with the sphere density. The grayscale level plot (FIG. 6C) indicates the void density across the SEM image montage (FIG. 6D) comprising three regions of the bilayer foam (S32, interface, and S46). The grayscale plot in FIG. 6C profiles the SEM images with each point representing the average pixel intensity, with the dotted-line presenting the moving average. The averaged pixel intensity shows the trend of void distribution in the interfacial region. Moving from the S32 to K46 layer, the density of voids sharply decreases at their interface, indicating that there are more voids formed at the interface.

Figure 6E:
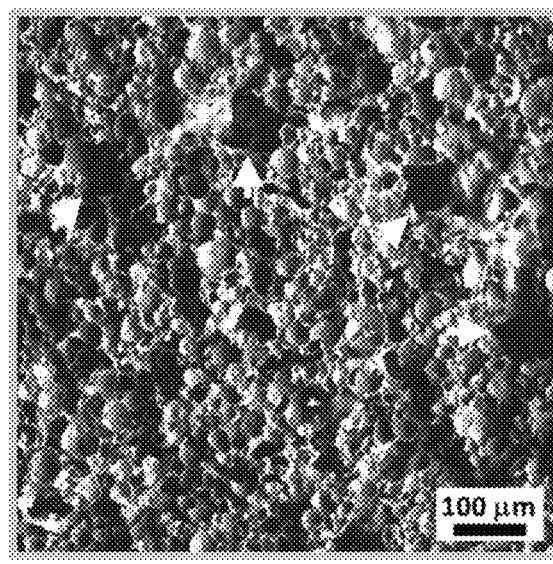
FIG. 6E is an SEM image of S32 where four (4) of the white arrows show open voids formation in a highly nonuniform microstructure.
Figure 6F:
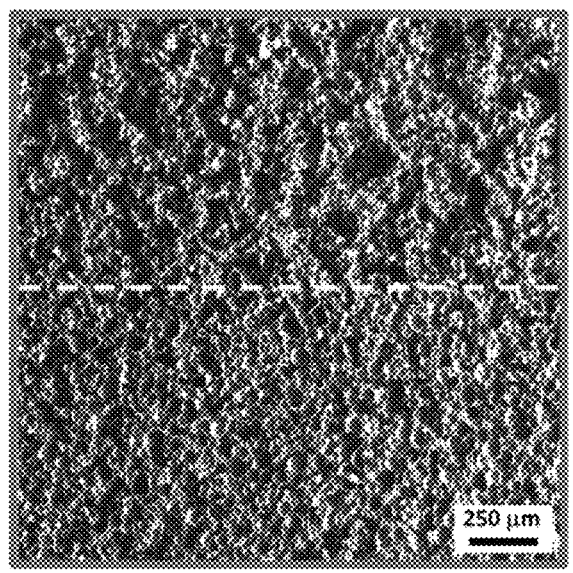
FIG. 6F is an SEM image of the interface layer.
Figure 6G:
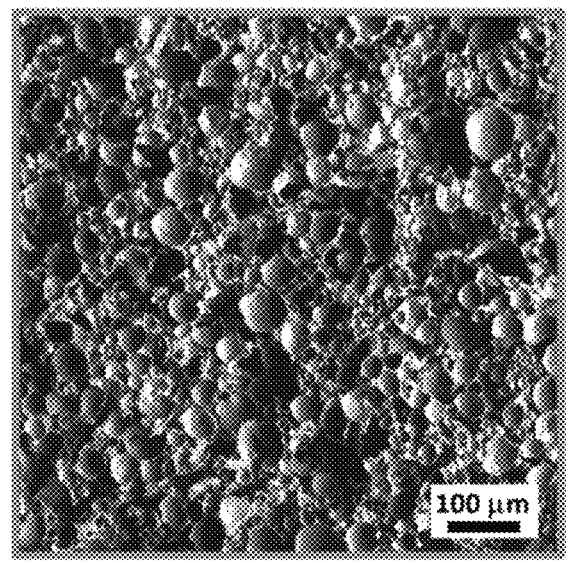
FIG. 6G is an SEM image of K46 where the arrows show open voids formation in highly nonuniform microstructure.

As shown in the micrographs (FIG. 6F), the interface of the co-cured sample is a transition region with unique microstructure from that of the bulk S32 and K46 foams. The K46 microstructure near the interface is similar to the one of the uniform K46 sample. By contrast, the S32 side microstructure exhibits many large open voids close to the interface. The voids at the interface are at least ~50 μm wide and 200 μm long, and are larger than the voids found in uniform S32 foam. The number of large voids decreases with distance away from the interface such that beyond 3 mm, the microstructure matches that of uniform S32 foam. The microstructures of K46 and S32 in FIGS. 6E-6G show local densification between adjacent spheres. Struts through the densification are thick and most spheres became interconnected, leading to the deformation of the cellular structure from the initial spherical shape of glass spheres. Above 840° C., open voids are known to appear as spheres consolidate further and the microstructure deforms more significantly. Formation of open voids is observed in both S32 and K46 foams and more numerous open voids are observed in the S32 layer (FIG. 6E). The SEM image of S32 foam in FIG. 6E shows highly nonuniform microstructure (arrows) that usually accompany open voids formation.

A more detailed cellular microstructure development of hollow glass spheres due to sintering process parameters such as sintering time and temperature have been observed. As the threshold method in image analysis allowed for distinguishing voids and cellular structure, the area fractions of voids were calculated from the SEM images. The area fraction of voids includes closed voids of hollow spheres and large open voids at the interface. SEM was used to observe microstructures of the S32 and K46 located far from the interface. The average area fraction of voids from S32 and K46 is around 75.4% and 76.0%, while the average area fraction of voids from the interface is 77.3%. Even though the average area fraction of voids of S32 and K46 is approximately the same, S32 has a greater number of larger voids than K46. The dense voids at the interface can be explained with different shrinkage rates of the two foams during sintering.

After sintering in a 67 mm diameter mold, the diameters of S32 and K46 bilayer foams were measured to be 51 and 59 mm, respectively (about 23% and 12% shrinkage in diameter). The driving force for sintering is the surface energy of the spheres and free surface area is reduced to lower the energy via the mass transport to allow spheres to consolidate. Mass transport via viscous plastic flow from the boundary to the neck at higher temperature causes shrinkage of the bilayer foam.

As shown in FIG. 6B, S32 spheres are bonded to K46 spheres at the interface and the shrinkage of S32 near the interface was limited by K46, even though the S32 shrinks more than K46. Therefore, the different strain from top and bottom foams would cause stress at the interface, resulting in open voids formation in S32 which has lower isostatic crush strength. Simulated compression, via FEM, of 2D Voronoi structures indicates that the void density does alter the mechanical response (FIGS. 7A-7D).

Figures 7A, 7B:
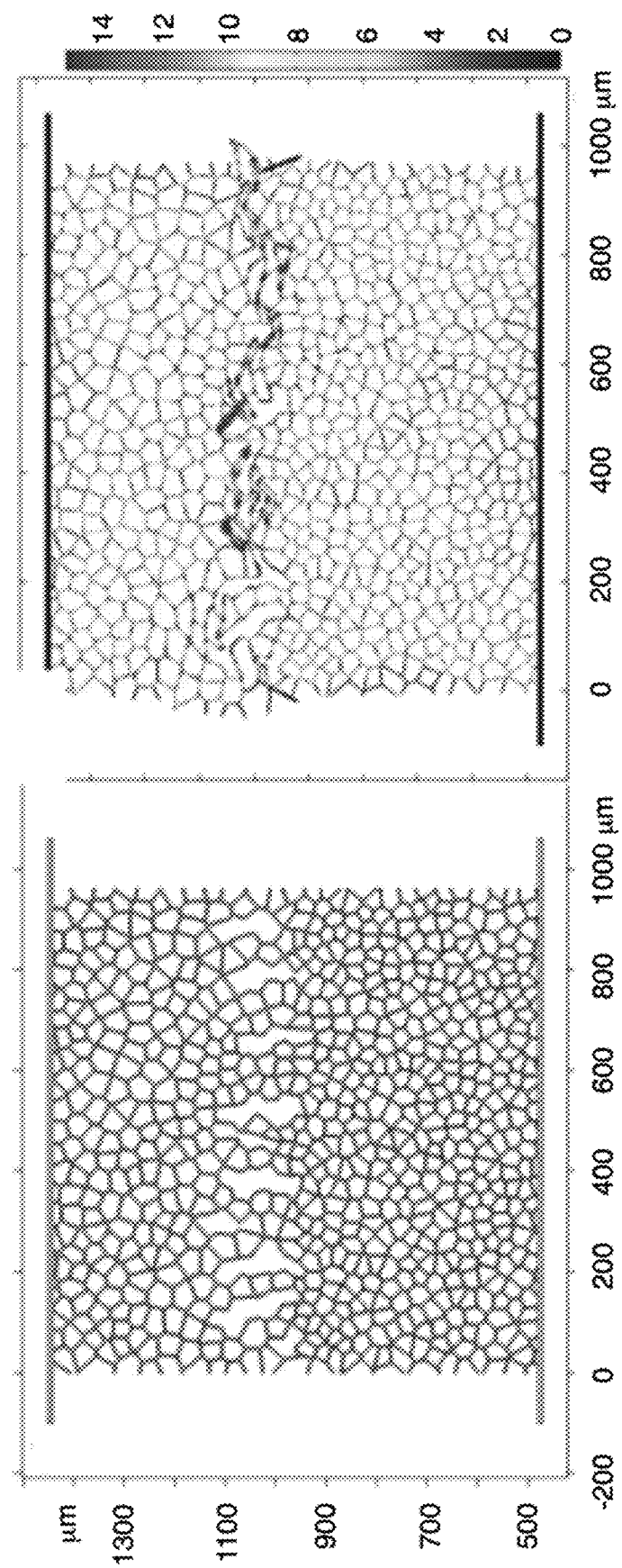

FIG. 7A shows a bilayer foam with larger voids at the interface with voids that are ~50 μm wide and 200 μm long, as observed in the SEM images. When the foam is compressed 10 μm, most deformation is observed on the interface and top layer (S32) with limited deformation presented by the bottom layer (K46). Furthermore, the large voids increase cell wall buckling beyond that of uniform foam (FIG. 7B); thus, the Von Mises stress is higher at the interface. Small lateral deformation indicates that brittle collapses propagate from the interface in the vertical direction, leading to a gradual collapse of the foam sample as shown in FIG. 7B. The evaluated yield stress from the FEM result is ~7 MPa.

A more uniform foam shows enhanced lateral deformation across all layers compared with the foam with larger voids (FIG. 7D). Furthermore, the Von Mises stress is more uniformly distributed in the foam. A large shear band occurs in the microstructure across the foam. The angle between shear band and loading direction is about 45°. The evaluated yield stress of the system in the FEM result is ~10 MPa which is higher than the foam with larger voids. Lateral deformation in the no void foam would also explain more side wall collapse in the images shown in the compression test (FIG. 4D).

The FEM results agree well with the experimental result even though the values of the FEM are higher than the measured. The difference comes from many local defects which usually exist in the microstructure and from some cellular structures which have not ideally consolidated like a FEM model. As seen in the experiments and the simulations, the contrast between the two samples can be explained by the increased density of interfacial voids in the co-cured sample that induces the plastic collapse at lower stress level.

Summary

Hollow glass spheres were sintered to produce bilayer cellular structures. The mechanical properties of bilayer foams fabricated by co-curing and epoxy bonding were compared and the microstructures and stress-strain curves were evaluated. Micrograph observations revealed that a high population of large voids (>50 μm in width) formed locally at the interface of the co-cured bilayer foam. Quasistatic compression measurement of co-cured samples showed a distinctive two-step stress-strain profile which has first lower plateau stress and second higher plateau stress.

Real-time observations showed a sequential collapse of each layer, indicating that the high number of voids at the interface induces lower local yield stress. A bilayer formed with epoxy did not show the step profile in its stress-strain curve and the profile is similar to uniform samples. The energy absorption capacities were calculated, and the co-cured foam was found to have 14.8% more specific energy absorption than epoxy-bonded foam. The results show that the co-cured bilayer is better able to limit impact stress and achieve a higher energy absorption capacity than uniform and epoxy-bonded foams. One of the critical features of the co-cured bilayer foam is the tunability that can be achieved by programming the thickness of each layer so that the range of each plateau stress can be adjusted, allowing the control of energy absorption.

Example 2

Figure 8A:
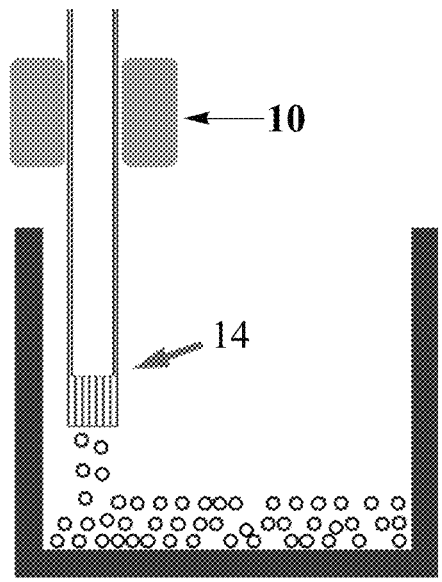
FIG. 8A is a schematic illustration of one embodiment of a dry powder printing dispenser of the disclosure.
Figure 8B:
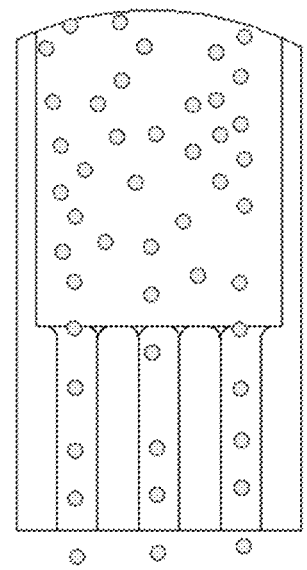
FIG. 8B is an expanded cross-sectional view of the dispenser tip of FIG. 8A.

Dry powder printing (DPP) system: A commercially available 3D printer was modified to develop a DPP system. The built-in extruding system was replaced with a customized dry powder dispensing nozzle. FIGS. 8A and 8B. As shown in FIG. 8A, vibrational motors (10) are attached to the dispenser (14) to facilitate dispensing of hollow microstructure materials. The dry powder dispensing nozzle was 10 mm in diameter with 15 small holes (1 mm in diameter) to dispense hollow microstructure materials. Two DC vibrational motors (10) were attached to the middle of the dispenser (14) and they are actuated with Arduino by adjusting pulse width modulation. Nine stainless steel cylindrical molds (67 mm inner diameter and 150 mm in height) were installed on a stainless-steel plate. The molds replaced the original 3D printing plates. Powder printings were optimized with feeding rate, infill rate, infill pattern, and layer height.

Glass Foam Fabrication: Two different hollow soda-lime-borosilicate glass microspheres (K20 and K46, 3M St. Paul, MN) were the feedstock material used in the fabrication of the cellular foams described herein. Five sets of samples were prepared for uniform K20 and uniform K46. Five sets of co-cured bilayer K20/K46 with each height ratio (1:3, 1:1, and 3:1) of K20 and K46 spheres were prepared. Lastly, an epoxy bonded bilayer K20/K46 with a 1:1 height ratio was prepared.

All the samples were prepared in the stainless-steel cylindrical molds with the DPP system. A box furnace (Lindburg/Blue M, ThermoFisher scientific) was used to remove moisture and sinter the spheres in the molds. The temperature of the furnace was ramped up to 150° C. and held for 120 min to drive off moisture from the sample. The molds were taken out of the furnace for another 300 taps and then the molds were put back in the furnace for sintering. The temperature was then ramped to 600° C. and a sample was held at that temperature for 180 min for uniform thermal distribution. The temperature was raised to a bonding temperature of 840° C. with a slow ramp rate (0.5° C./min), and held at that temperature for 20 min. After the bonding process, the temperature was decreased to 560° C. at a rate of 0.5° C./min and held at that temperature for 360. Finally, the temperature was decreased to room temperature at a rate of 0.5° C./min.

Mechanical testing: All the testing samples were carefully trimmed into cylindrical samples (33 mm in diameter with 1.0 aspect ratio) for uniaxial compression testing. For the epoxy bonded sample, uniform cylindrical samples were prepared for each K20 and K46 sphere. The K20 and K46 samples were glued together with epoxy (Loctite E-90FL, Epoxy Adhesive). About 0.03 g to 0.05 g of epoxy was smeared to the interface to make bilayer samples and cured for 24 hrs. The width, height, and weight of each sample were measured to calculate the density of each sample. The coating layer (Plasti dip) was sprayed on all the samples to mitigate the brittle fractures. Quasistatic uniaxial compression testing was performed using a loading stand (MTS, Eden Prairie, MN) at $10^{-3}$/sec strain rate. Time-lapse of the samples during compression testing was recorded using a camera (Nikon D5100. AF Micro-Nikkor 200 mm f/4D IF-ED). In some cases, stress-strain curves showed that the stress change from elastic to plastic behavior was not distinctive. In such cases, the offset yield method was used to determine the yield strength. A line was constructed parallel to the initial linear region of the stress-strain curve but was offset by 0.2% from the origin. The 0.2% offset yield strength is the stress at which the constructed line intersects the stress-strain curve. Stress-strain plots were obtained using a 50% Percentile Filtering method to remove noise.

Scanning Electron Microscopy: To observe its microstructure, cellular solid samples were cleaved and observed in the SEM (TESCAN, VEGA-II), followed by post-image analysis. Post-measurement analysis of the compression testing produced stress-strain curves which provided mechanical properties, such as energy absorption and yield strength.

Results

Fabrication of bilayer foam with dried microspheres with controlled thickness and well-defined interface requires a system dispensing the spheres in a well-controlled manner. A commercially available 3D printer was modified to develop a DPP system. The built-in extruding system was replaced with a customized dry powder dispenser (FIGS. 8A and 8B). The dry powder dispenser is 10 mm in diameter with 15 small holes (1 mm in diameter). The powder printing rate was controlled with the intensity of two DC vibrational motors (10) which are attached to the nozzle (14). The area of the printed spheres through the multiple small holes in the nozzle is similar to the outer diameter (OD) of the nozzle.

The nozzle moves and prints in a zig-zag infill pattern and the spheres were printed up to the edge of the mold without any empty space at the edge. The printing rate was controlled with a pulse width modulation (PWM). The external force is needed to dispense the powders, resulting in erratic flow such as flooding. To avoid flooding, the nozzle was initially blocked with the vibrating motors, inducing spheres to pack themselves. It prevents flooding and powder printing can be controlled with On/Off control of vibration. The printing rate of DPP and a printing layer height were used to determine the speed of the print. Nine stainless steel molds were placed in the DPP system. Nine samples of K46 were printed and their weight was measured. The average weight was 6.79±0.31 g, indicating that the differences between samples were at most 9%. The density of the foams was calculated as 0.37±0.01 g/cc, indicating that the DPP system prints samples reproducibly.

Uniform and bilayer K20 and K46: As the microspheres are sintered, the walls of adjacent spheres start to form a strut, resulting in a foam with cellular microstructure. The density of the sintered uniform foam was determined to be 0.37 and 0.18 g/cc for K46 and K20, respectably. As spheres consolidate with neighboring spheres above the glass transition temperature ($T_g$) for soda-lime-borosilicate glass, the foam shrinks. There was a relatively large difference in modulus, yield strength, and onset densification between these foams.

It is believed that at the initial compression, the linear elastic regime starts via cell edge bending and cell face stretch. The energy under the elastic regime is proportional to the stiffness and thickness of the cell edge and wall, which are in turn related to the relative density of the samples. (0.17 g/cc and 0.08 g/cc for K46 and K20, respectively). The stress reaches yield stress, followed by long plateau stress which contributes to the energy-absorbing capacity of the cellular foam via the brittle collapse of the microstructure. After the brittle collapse, densification begins, and the stress-strain curve rises steeply and denser samples exhibit an early onset of densification. As the K46 foam becomes denser, the onset densification strain d value was found to be 0.6 while K20 foam starts densification at 0.59. These values were obtained using the energy efficiency curve and the value doesn't depict the real onset densification. A different method using the intersection of the tangents to the stress plateau regime and the densification regime provides a more real value which is 0.69. A. Paul, U. Ramamurty Tangent method for K46 gives 0.63 which is not significantly different from the value obtained from the energy efficiency method.

Figure 9A:
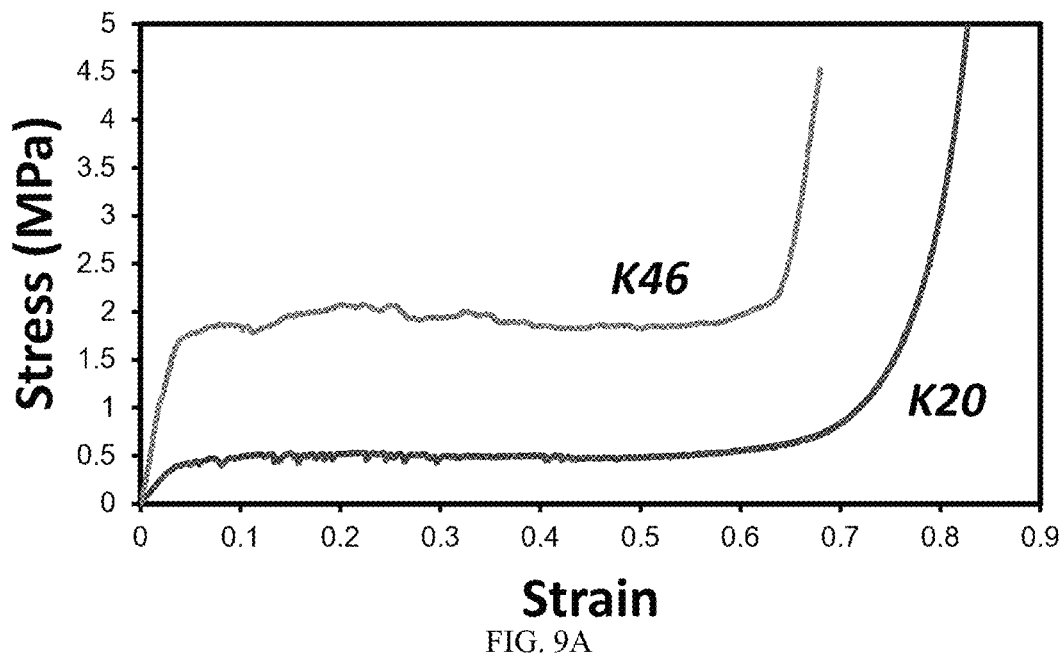
FIG. 9A shows the stress-strain profile of uniform foams K20 and K46.
Figure 9B:
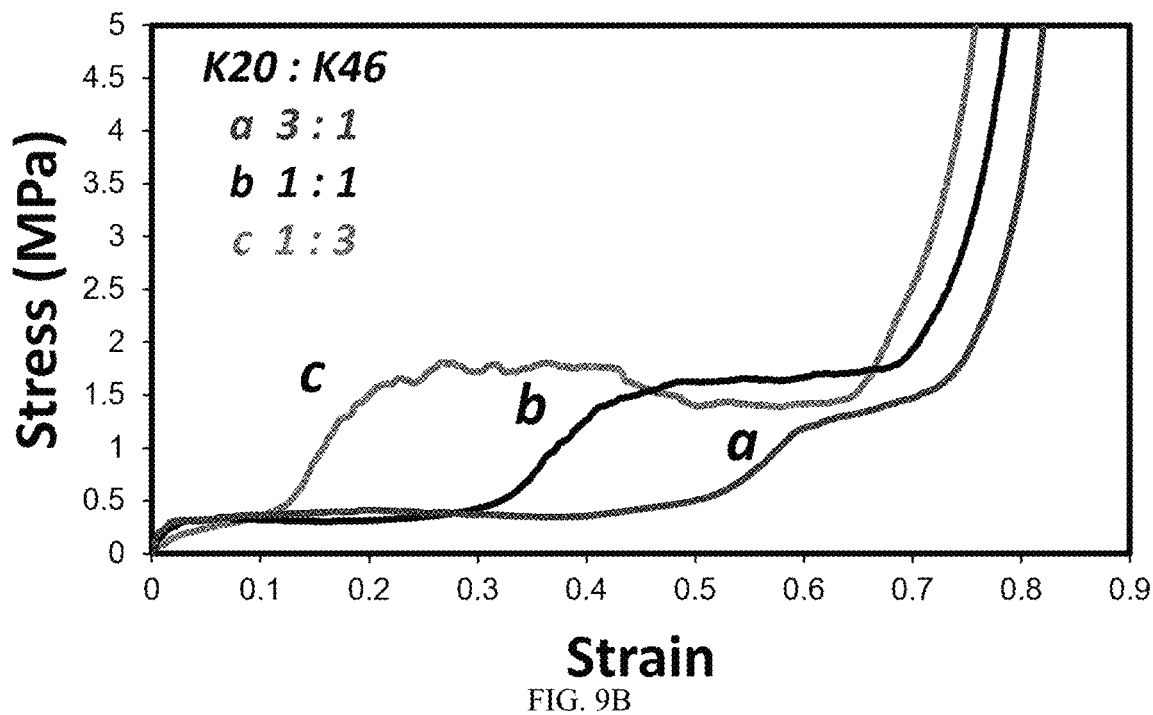
FIG. 9B shows the stress-strain profile of co-cured bilayer foams with three thickness ratios of K20:K46 (a=3:1, b=1:1, and c=1:3).

K20 and K46 hollow glass microspheres were used to fabricate bilayer foams to demonstrate tunable stress-strain profiles. Bilayer foams were prepared with different thickness ratios (K20:K46=3:1, 1:1, and 1:3) between K20 and K46 by the DPP system, followed by a sintering process. After the sintering, the co-cured bilayer foams were subjected to quasistatic uniaxial compressive load with $10^{-3}$/sec strain rate. FIG. 9A shows the stress-strain profile of monolayers K20 and K46. FIG. 9B shows the stress-strain profile of co-cured bilayer foams with three thickness ratios. Unlike stress-strain profiles for monolayers K20 and K46 in FIG. 9A, each curve in the stress-strain profile of bilayers in FIG. 9B shows a distinctive two-step profile due to its sequential compression. The low-density K20 layer is compressed first for all three cases and their plateau stress is slightly less than 0.5 MPa. The curves start to increase at the end of the first plateau and reach the second plateau with the onset of compression of the K46 layer. The strain where the stress rises to the second plateau stress differs with the ratio of layer thickness. The first plateau region ends early at about strain 0.1 for the foam with a thinner K20 layer (line c in FIG. 9B) and the first plateau ends around strain 0.5 for the foam with a thicker K20 layer (line a in FIG. 9B). The slope of the transition to the second plateau was found to be changing as the thickness ratio of the bilayers is configured differently. As can be seen in FIG. 9B, foam (c) shows a much steeper modulus transition and foam (a) shows the least steep transition. The foam (a) has a 56% difference in modulus from the foam (c) and the modulus of foam (b) is located in between (a) and (c).

Figure 9C:
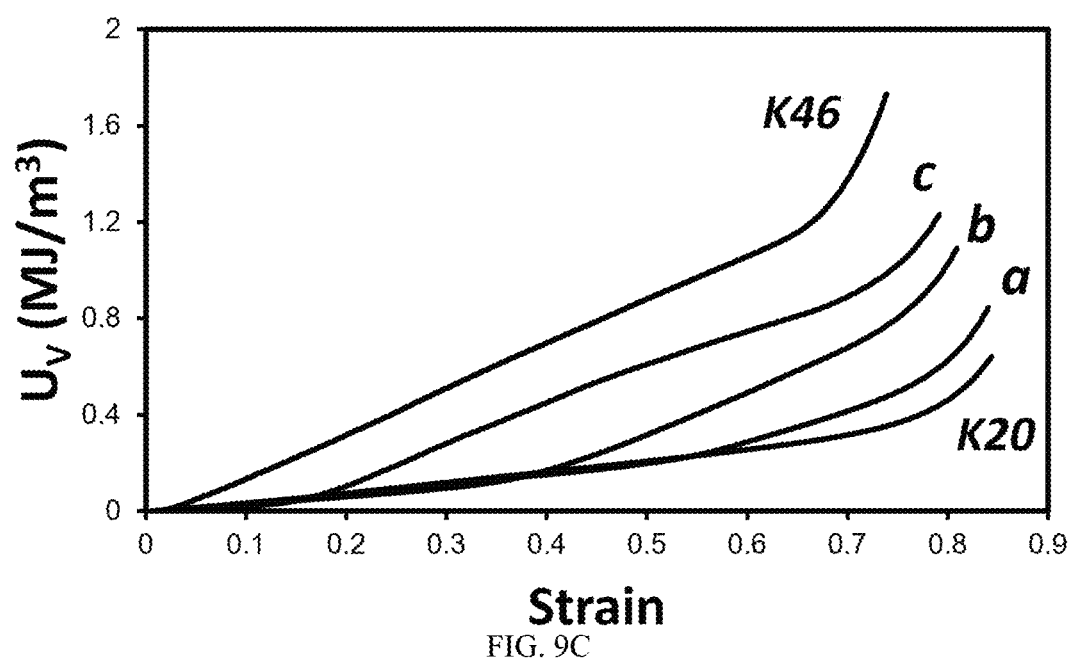
FIG. 9C shows energy absorption per unit volume ($U_V$) of both uniform foams (K46 and K20) and co-cured bilayer foams with three thickness ratios of K20:K46 (a=3:1, b=1:1, and c=1:3).
Figure 9D:
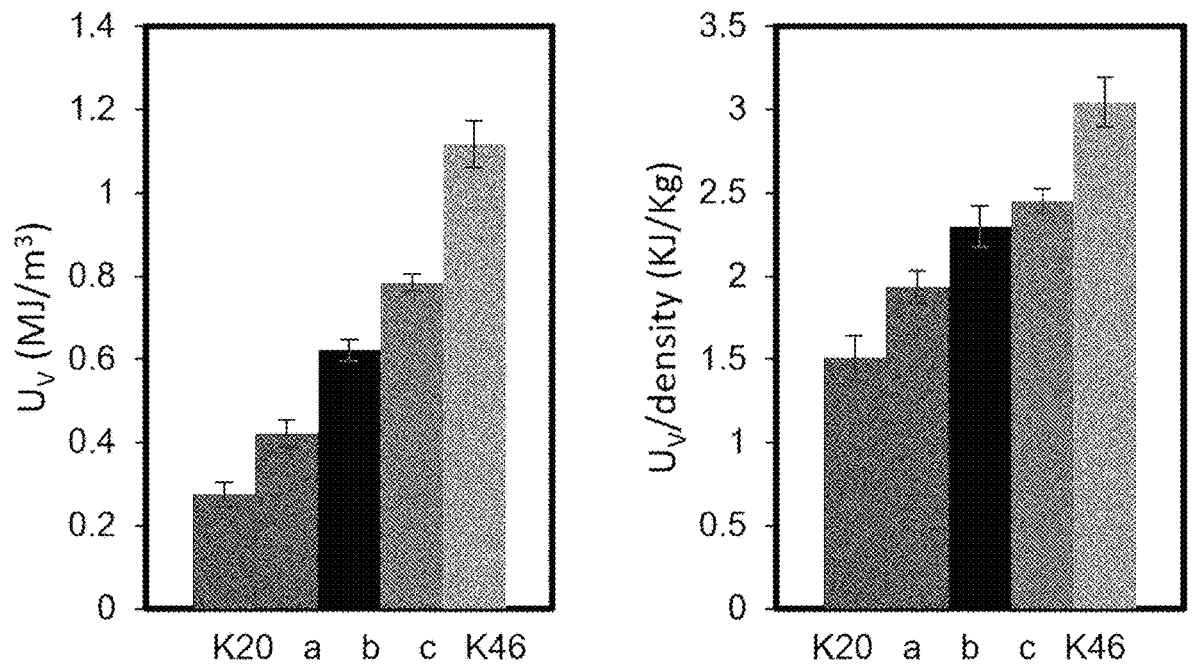
FIG. 9D is bar graphs for $U_V$ and specific energy absorption $U_m(=U_V/\text{density})$ for uniform foams K20 and K46 and co-cured bilayer foams with three thickness ratios of K20:K46 (a=3:1, b=1:1, and c=1:3).

The second plateau stress values are different with the configurations of the layer thickness. The foam (c) with a thicker K46 layer shows a larger 1.7 MPa while the foam (a) with a thinner K46 layer is about 1.2 MPa. These values are lower than the one of uniform K46 (2 MPa). The interface of the co-cured bilayer foams usually includes large voids clusters due to induced interfacial stress from different sintering rates. It probably lowers the overall stress values of the co-cured foams. Lastly, the foams start to densify and their onset is found to be shifting and it seems related to the K20 layer thickness. The foam (a) with a thicker K20 layer shows onset densification 14% more compared to the foam (c) with a thin K20 layer. The transition slope and the onset strain for densification are potentially other tunable values of co-cured bilayer glass foam that can be designed to reduce injury. Energy absorption per unit volume ($U_V$) of both uniform and bilayer foams are shown as a function of strain in FIG. 9C and the figure is calculated simply from the area under the stress-strain curves. The figure clearly shows uniform K46 and K20 foams deliver maximum and minimum energy absorption. Bilayer foams are located in between the uniform foams. The foam with a thicker K46 layer is closely located to the uniform K46 as expected. The energy absorption per unit volume ($U_V$) is calculated up to the strain d at which densification begins, and the bar graphs in FIG. 9D show $U_V$ and specific energy absorption $U_m(=U_V/$density) for each foam as well as uniform foams K20 and K46. Both graphs also show gradual changes with varying layer thickness ratios of the two components.

Figure 10A:
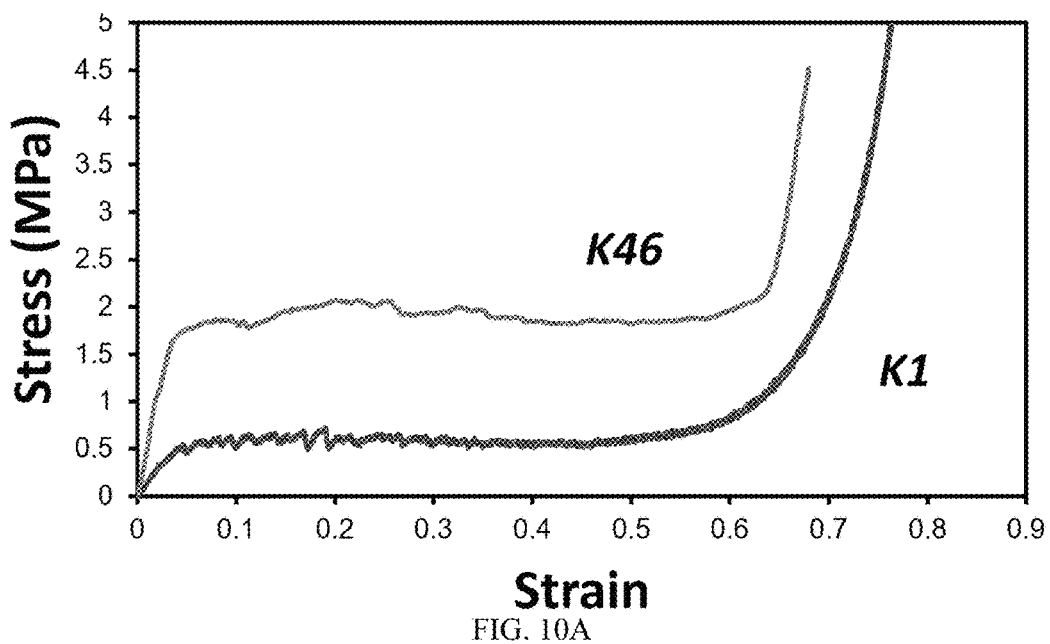
FIG. 10A is a graph showing the mechanical response of uniform foams K1 and K46 from the uniaxial compression test.

Uniform and bilayer K1 and K46: The density of the sintered uniform foam is 0.37 and 0.28 g/cc for K46 and K1, respectively. Given the true density of K1 spheres is 0.12 g/cc, K1 foam was densified more compared to other foams through the sintering process. Each sphere has different consolidation kinetics with its density, wall thickness, and material which requires different optimal process conditions. To investigate the tunable properties of bilayer foams, identical process parameters were applied for all the samples. FIG. 10A shows the mechanical response of uniform K1 and K46 foams from the uniaxial compression test. There are large differences in modulus, yield strength, and onset densification between the samples. The curves are very similar to K20 and K46 in FIG. 9A.

Figure 10B:
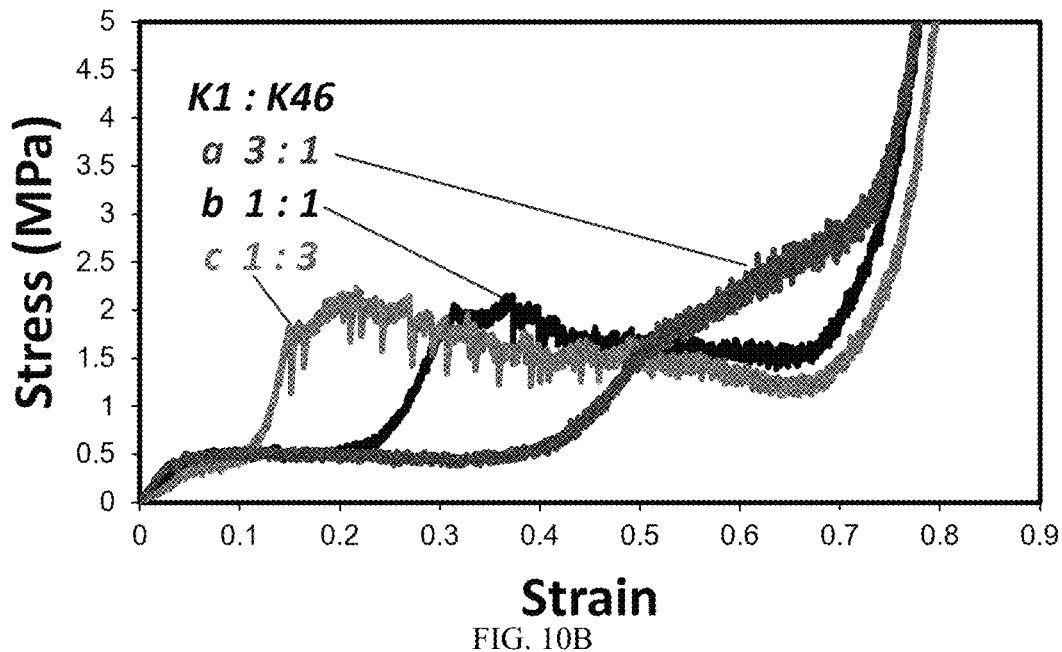
FIG. 10B shows the stress-strain profile of co-cured bilayer foams with three thickness ratios of K1:K46 (a=3:1, b=1:1, and c=1:3).
Figure 10C:
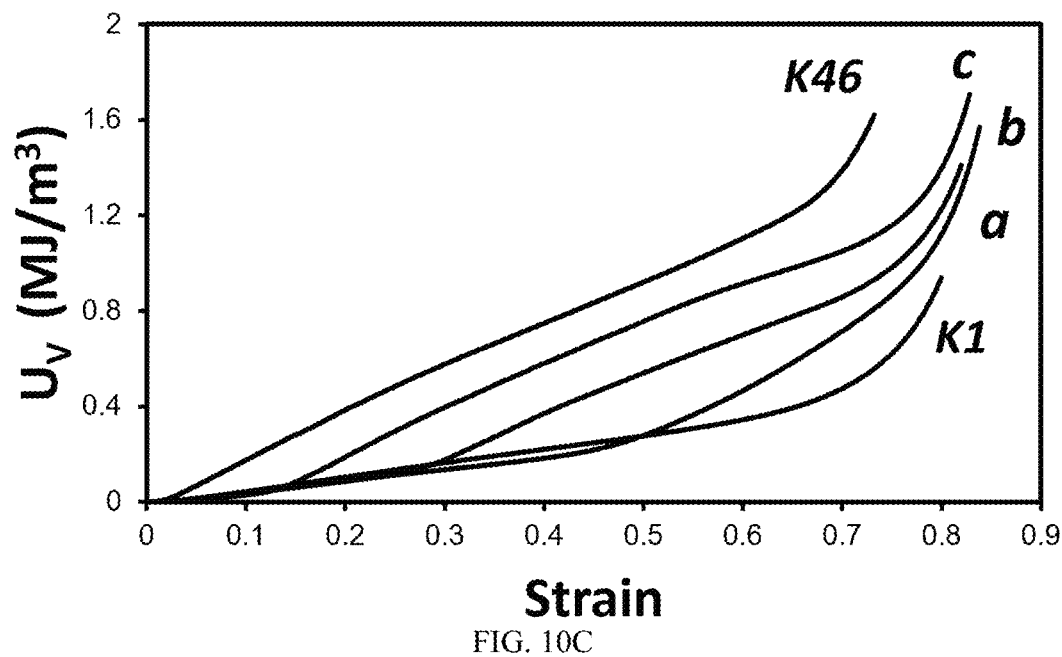
FIG. 10C shows energy absorption per unit volume ($U_V$) of both uniform foams (K46 and K1) and co-cured bilayer foams with three thickness ratios of K1:K46 (a=3:1, b=1:1, and c=1:3).
Figure 10D:
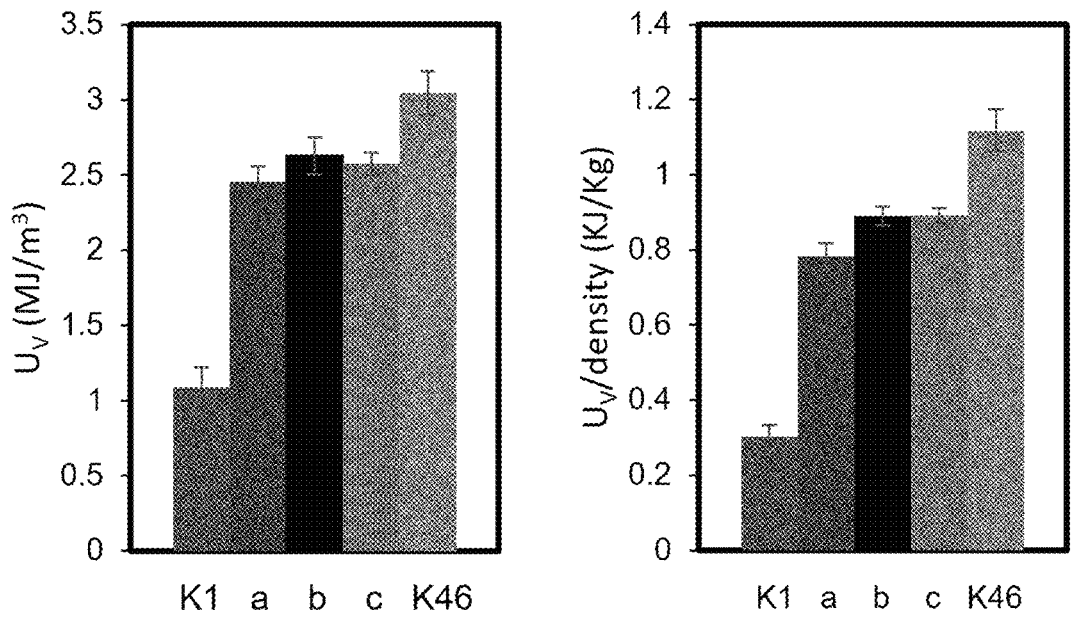
FIG. 10D is bar graphs for $U_V$ and specific energy absorption $U_m(=U_V/\text{density})$ for uniform foams K1 and K46 and co-cured bilayer foams with three thickness ratios of K1:K46 (a=3:1, b=1:1, and c=1:3).

Modulus values for K1 and K46 were determined to be 24 and 56 MPa, respectively, via cell edge bending and cell face stretch. After the long plateau stress through brittle collapses, densification occurs, and the stress-strain curve rises steeply. Denser K46 exhibits densification more abruptly while K1 shows slow and long densification. Their onset values are similar at about 0.62. See FIG. 10A. Co-cured bilayer of K1 and K46 is similarly showing the 2-step stress-strain profile as shown in FIG. 10B. The thickness ratio also determines the strain where the second plateau stress starts. The transition from first to second plateau stress is smoother for foam (a) which is thinner K46 and the difference in the slope of the transition is about 120%. Plateau stress of (b) and (c) gradually decreases which can be explained by the brittle nature of the foam which was not observed in K20-K46 bilayer foam since the density of sintered K1 foam is higher than K20 foam. Also, interfacial void clusters could have induced internal fracture that leads to a gradual decrease of plateau stress. While the 2 foams (b) and (c) show a decreasing trend, sample (a) shows an increase in the second plateau stress, and the increase can be explained by less fracture of the thinner K46 layer. The thicker K46 layer would have a higher chance to be fractured since the uniaxial compression would propagate through the thicker layer. The onset densification of co-cured foam is increased up to 20% from uniform foam. Energy absorption of the uniform K1 and K46 foams and bilayer of K1 and K46 is also shown as a function of strain in FIG. 10C and demonstrated tunable property. The energy absorption per unit volume ($U_V$) is calculated up to the strain d at which densification begins, and the bar graphs in FIG. 10D show $U_V$ and specific energy absorption $U_m(=U_V/$density) for each foam as well as uniform foams K1 and K46. Both graphs also show gradual changes with varying layer thickness ratios of the two components.

Figure 11A:
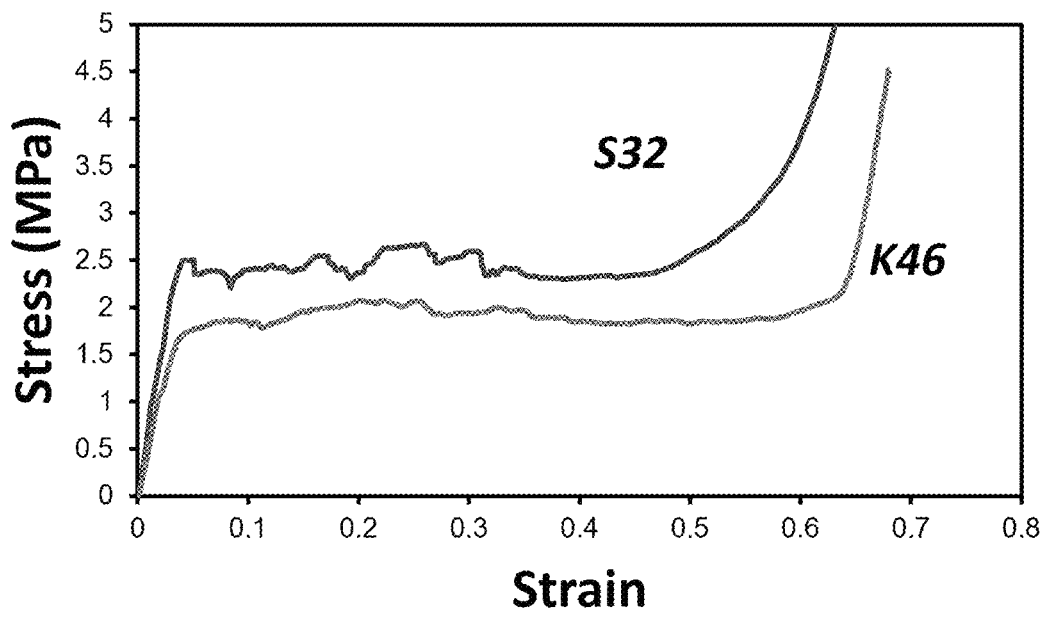
FIG. 11A is a graph showing the mechanical response of uniform foams S32 and K46 from the uniaxial compression test.
Figure 11B:
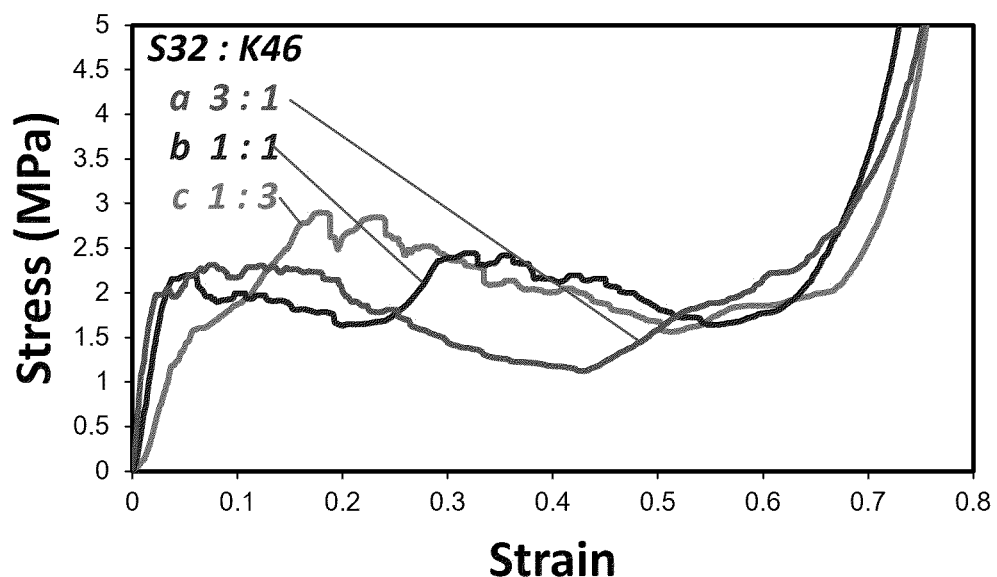
FIG. 11B shows the stress-strain profile of co-cured bilayer foams with three thickness ratios of S32:K46 (a=3:1, b=1:1, and c=1:3).
Figure 11C:
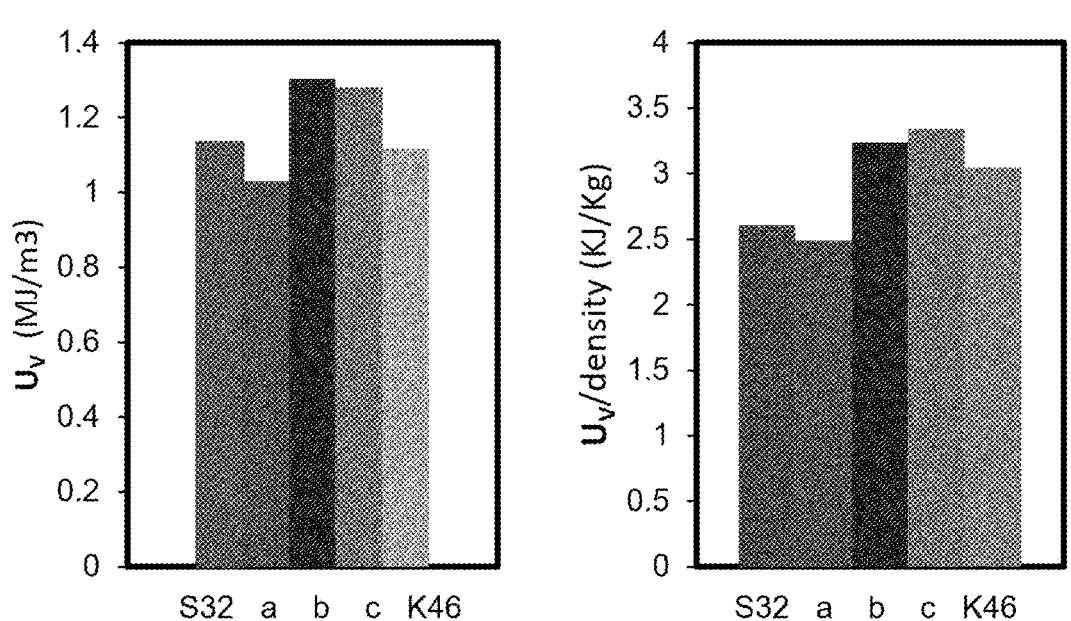
FIG. 11C is bar graphs for $U_V$ and specific energy absorption $U_m(=U_V/\text{density})$ for uniform foams S32 and K46 and co-cured bilayer foams with three thickness ratios of S32:K46 (a=3:1, b=1:1, and c=1:3).

Uniform and bilayer S32 and K46: The density of uniform S32 and K46 foams are 0.43 and 0.37 g/cc, respectively. At a given process temperature, S32 spheres consolidate more aggressively and show more shrinkage in terms of the diameter of foam, resulting in a higher density of the foam. FIG. 11A shows the mechanical response of uniform S32 and K46 foams. S32 foam overall provides higher mechanical properties than K46 spheres with higher modulus, and plateau stress. Onset densification is at a lower strain as 0.5. Co-cured bilayer of S32 and K46 is similarly showing the 2-step stress-strain profile like other co-cured foams. FIG. 11B. The strain for the onset second plateau stress is located with changing thickness ratio of the layers. A gradual decrease in plateau stress becomes more significant due to the brittleness of the denser foams. Also, interfacial stress could have induced additional fracture that promotes a gradual decrease of plateau stress. The transition from first to second plateau stress is smoother for foam (a) which is thinner K46. The onset densification of co-cured foam is increased to 0.61 to 0.65 strain range. It seems that the onset densification is determined by the softer layer for all three sets of samples, including K1-K46, and K20-K46. The bar graphs in FIG. 11C show that the sample (b) and (c) has more energy absorption by volume and also in specific energy absorptions. The increase can be explained by the extended onset densification of bilayer foam. The stress-strain curve shows that K46 initially gets crushed providing first lower plateau stress and it is followed by S32 crush at higher plateau stress. Interestingly, the second plateau stress continues to the onset densification 0.6 which is the same as the one of uniform K46. Even though the tunable energy absorption was not achieved, the stress-strain profile can be still tunable, so the initial impact acceleration can be reduced in the first plateaus stress and still impact energy can be still absorbed by the second plateau stress.

Figure 12A:
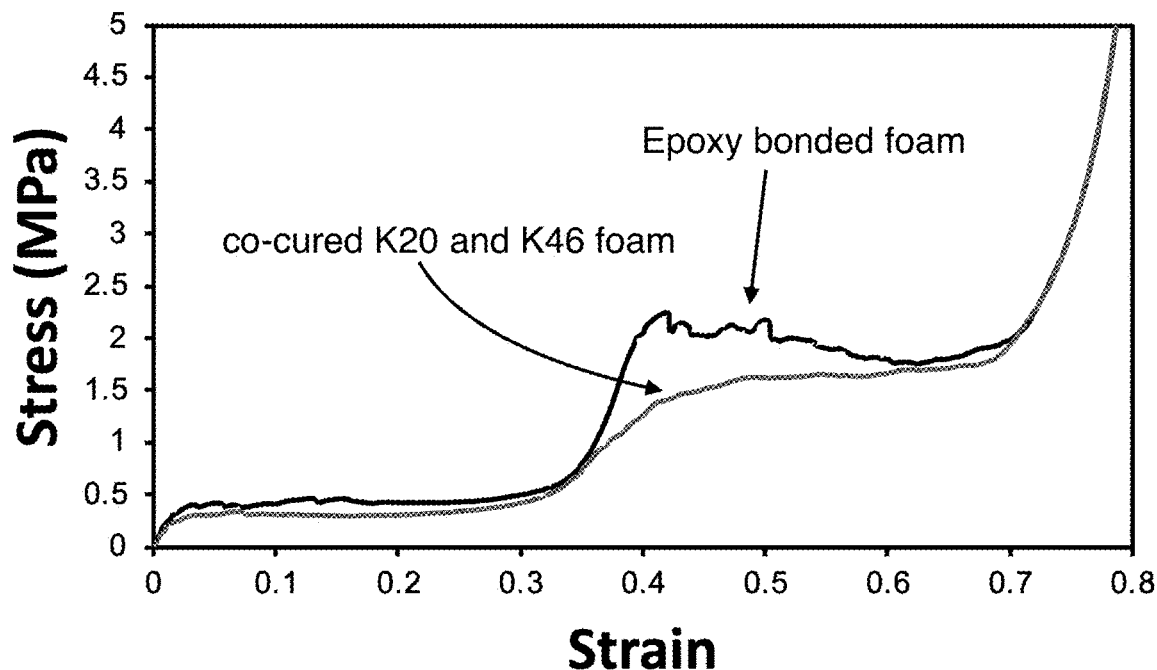
FIG. 12A shows the comparative compression tests of the epoxy-bonded bilayer foam and co-cured bilayer foam using K20 and K46 HGMs.
Figure 12B:
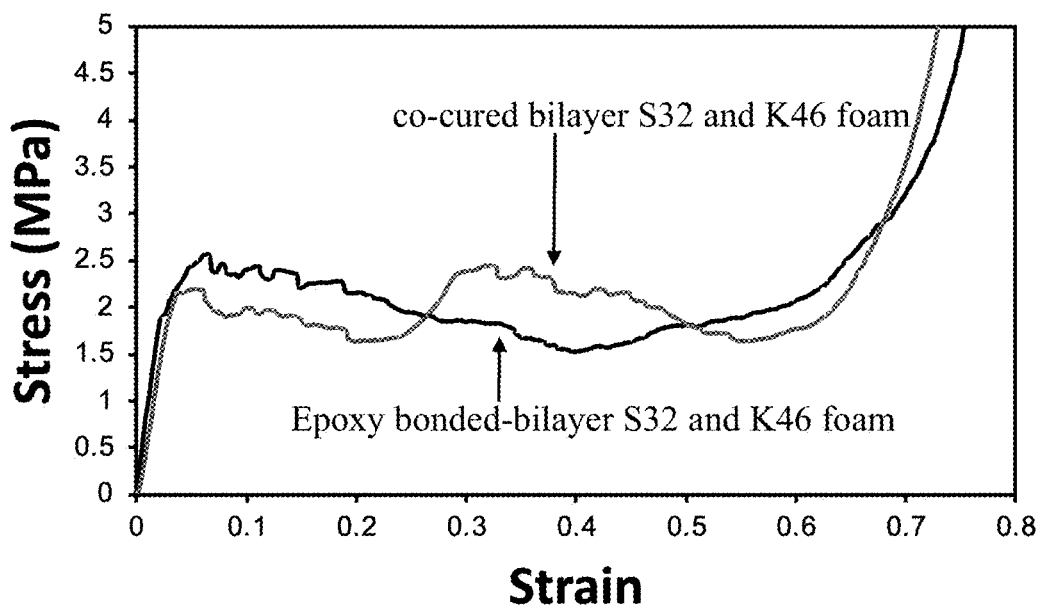
FIG. 12B shows the comparative compression tests of the epoxy-bonded bilayer foam and co-cured bilayer foam using S32 and K46 HGMs.

Epoxy-bonded vs. co-cured bilayer foams: FIG. 12A shows the comparative compression tests of the epoxy-bonded bilayer foam and co-cured bilayer foam using K20 and K46 HGMs. FIG. 12B shows the comparative compression tests of the epoxy-bonded bilayer foam and co-cured bilayer foam using S32 and K46 HGMs. The foam behaves differently with their stress rising with a slightly higher modulus than their co-cured counterparts. Modulus increases in the epoxy-bonded foams are 75% for K20-K46 and 11% for S32-K46. Stress-strain curves of co-cured and epoxy-bonded K20-K46 foams are similar up to strain about 0.35. As the second layer which is K46 starts to get compressed, stress increases up to 1.7 MPa in both foams. Epoxy foam exhibits a large overshoot of stress up to 2.3 Mpa and comes down to 1.9 Mpa gradually. On the other hand, co-cured foam shows a much smoother transition. This difference in transition may play an important role in terms of injury. Steep increase and overshoot of the force could put more stress on a passenger, and thus the smoother transition is preferred. Densification begins around 0.68 for both K20-K46 foams. The energy absorption of epoxy-bonded foam is 19% larger than co-cured foam. Epoxy foam made of S32-K46 shows different mechanical responses from the epoxy foam of K20-K46. Co-cured S32-K46 foam shows distinctive 2-step compression behaviors of bilayer structure. As stress increases steeply in the elastic regime, it starts to show plateau stress up to 0.25 strain. Stress increases again up to 2.5 MPa and plateau stress with gradual decrease exists till the foam densifies at 0.62 strain. On the other hand, the epoxy foam has higher peak stress, followed by long plateau stress without second peak stress up to 0.6 strain which is onset densification. Since the density of the two materials is similar, the epoxy-bonded bilayer shows the compression behavior of uniform foams. However, co-cured bilayer foam has a unique interfacial structure which is larger voids clusters. The void clusters were formed during sintering due to the different shrinkage rates of the foams. The interfacial void cluster leads to initial compression in S32 layer first, followed by compression of K46 layer. In the K20-K46 system, the materials have a large difference in their densities in the materials so the effect of the interfacial void cluster is not as significant. The average energy absorption of co-cured samples (3.05 kJ/kg) is slightly higher than that of the epoxy-bonded sample (2.74 kJ/kg).

Summary

Several types of hollow glass spheres were sintered to produce bilayer cellular structures. The mechanical properties of all 3 bilayer cellular foam compositions produced by co-curing show tunable strain-stress profiles, for example, via controlling layer thickness ratios. The smoothness of transition from first to second plateau stress was found to be tunable. Overall, onset densification of the bilayer is determined by the foam with lower density, resulting in delayed onset densification. Energy absorption was found to be tunable when the difference in densities of the two foams is greater (K1-K46 and K20-K46). When the difference is small, the overall absorption was greater than uniform foams with help of delayed onset densification (S32-K46). The mechanical properties of bilayer forms fabricated by co-curing and epoxy bonding were compared. The bilayer foams with a larger density difference (K20-K46) showed the same 2-step stress-strain profile except that the transition between the first and second plateau stress was more abrupt and higher peak in epoxy-bonded foam. The bilayer foams with smaller density differences (S32-K46) show different profiles and the epoxy-bonded foam didn't show 2-step stress-strain profile. One of the important features of the co-cured bilayer foam is the tunability that can be achieved, e.g., by programming the thickness of each layer so that the range of each plateau stress can be adjusted, allowing the control of energy absorption.

The foregoing discussion of the subject matter of the present disclosure has been presented for purposes of illustration and description. The foregoing is not intended to limit the scope of the present disclosure to the form or forms disclosed herein. Although the description of the subject matter of the present disclosure includes the description of one or more embodiments and certain variations and modifications, other variations and modifications are within the scope of the present disclosure, e.g., as may be within the skill and knowledge of those in the art, after understanding the present disclosure. It is intended to obtain rights, which include alternative embodiments to the extent permitted, including alternate, interchangeable, and/or equivalent structures, functions, ranges or steps to those claimed, whether or not such alternate, interchangeable, and/or equivalent structures, functions, ranges or steps are disclosed herein, and without intending to publicly dedicate any patentable subject matter. All references cited herein are incorporated by reference in their entirety.

What is claimed is:

1. A cellular foam composition comprising a plurality of layers, wherein said cellular foam composition comprises:
   a first foam layer made from a first hollow microsphere material;
   a second foam layer made from a second hollow microsphere material; and
   interfacial layer comprising interfacial voids located between said first foam layer and said second foam layer,
   wherein a density of said first hollow microsphere material is different from a density of said second hollow microsphere material.

2. The cellular foam composition of claim 1, wherein an average width of interfacial voids is at least about 50 μm.

3. The cellular foam composition of claim 1, wherein said first hollow microsphere material and said second hollow microsphere material comprises glass, a metal, a ceramic, a polymer, a hollow fiber, a nanoparticle, or a mixture thereof.

4. The cellular foam composition of claim 1, wherein an average E-modulus of said cellular foam composition is at least about 200 MPa.

5. The cellular foam composition of claim 1, wherein said cellular foam composition has a distinctive multi-step stress strain profile.

6. The cellular foam composition of claim 5, wherein said cellular foam composition has a distinctive two-step stress strain profile.

7. A glass cellular foam composition produced by a process comprising heating a hollow glass microsphere mixture under conditions sufficient to produce a glass cellular foam composition, wherein said hollow glass microsphere mixture comprises a plurality of layers of co-cured hollow glass microspheres, wherein each layer of said hollow glass microspheres has a different glass wall thickness relative to hollow glass microspheres in an adjacent layer, and wherein said step of heating said hollow glass microsphere mixture produces interfacial voids between each layer of said hollow glass microsphere mixture.

8. The glass cellular foam composition produced by the process of claim 7, wherein said glass cellular foam composition comprises a bilayer of co-cured hollow glass microspheres.

9. The glass cellular foam composition produced by the process of claim 8, wherein said glass cellular foam composition comprises an interfacial layer between layers of said co-cured hollow glass microspheres, and wherein said interfacial layer comprises interfacial voids.

10. A device comprising a glass cellular foam composition of claim 7.

11. The device of claim 10, wherein said device comprises a helmet, a body armor, a packaging material, a seat, an energy absorber, or a mechanical damper.

12. A method for producing a cellular foam composition having a plurality of step stress strain profiles, said method comprising:
  (a) forming a composition comprising a plurality of hollow microsphere material layers by:
    (i) placing a first layer of a first hollow microsphere material having a first density adapted for forming a first cellular foam layer;
    (ii) placing a second layer of a second hollow microsphere material having a second density that is different from said first density on top of said first layer adapted for forming a second cellular foam layer;
    (iii) optionally adding another layer of hollow microsphere material having another density on top of said second layer adapted for forming an another cellular foam layer;
    (iv) optionally repeating step (iii) by placing another hollow microsphere material on top of said layer of step (iii); and
  (b) subjecting the plurality of layered composition to conditions sufficient to form said cellular foam composition comprising a plurality of cellular foam layers, wherein each adjacent cellular foam layer has a different density from each other and wherein said cellular composition comprises an interfacial layer comprising interfacial voids in between said first cellular foam layer and said second cellular foam layer and optionally in between any other adjacent cellular foam layer.

13. The method of claim 12, wherein said cellular foam composition has a distinctive multi-step stress strain profile, and wherein the number of multi-step stress strain profile is n−1 or less, wherein n is the number of cellular foam layers present in said cellular foam composition.

14. The method of claim 12, wherein an energy absorbing property of said cellular foam composition is modified by modifying the thickness of said first cellular foam layer, thickness of said second cellular foam layer, thickness of any another cellular foam layer that may be present, or a combination thereof.

15. The method of claim 12, wherein said cellular foam composition is a bilayer cellular foam composition.

16. The method of claim 15, wherein said first hollow microstructure material and said second hollow microstructure material are hollow glass microspheres having a different wall thickness.

17. The method of claim 16, wherein said step (b) comprises sintering or co-curing said hollow glass microspheres to produce said cellular foam composition.

18. The method of claim 17, wherein said cellular foam composition exhibits at least about 10% or more specific energy absorption than a comparative cellular foam composition, wherein said comparative cellular foam composition is produced using an adhesive between the first hollow microstructure material and the second hollow microstructure material.

* * * * *